US011960929B2

(12) United States Patent
Patti et al.

(10) Patent No.: US 11,960,929 B2
(45) Date of Patent: Apr. 16, 2024

(54) AUTOMATED RUNBOOK OPERATION RECOMMENDATIONS

(71) Applicant: Oracle International Corporation, Redwood Shores, CA (US)

(72) Inventors: Raghu Hanumanth Reddy Patti, San Bruno, CA (US); Christopher A. Roy, Amherst, NH (US); Ana Maria Hernandez McCollum, Belmont, CA (US); Manas Goswami, San Ramon, CA (US); Constantina Marshman, Amherst, NH (US)

(73) Assignee: Oracle International Corporation, Redwood Shores, CA (US)

( * ) Notice: Subject to any disclaimer, the term of this patent is extended or adjusted under 35 U.S.C. 154(b) by 0 days.

(21) Appl. No.: 17/850,051

(22) Filed: Jun. 27, 2022

(65) Prior Publication Data

US 2023/0068096 A1   Mar. 2, 2023

Related U.S. Application Data

(63) Continuation-in-part of application No. 17/725,143, filed on Apr. 20, 2022.
(Continued)

(51) Int. Cl.
*G06F 9/48* (2006.01)
*G06F 9/38* (2018.01)
(Continued)

(52) U.S. Cl.
CPC .......... *G06F 9/4881* (2013.01); *G06F 9/3836* (2013.01); *G06F 9/542* (2013.01);
(Continued)

(58) Field of Classification Search
None
See application file for complete search history.

(56) References Cited

U.S. PATENT DOCUMENTS

| | | | |
|---|---|---|---|
| 8,533,608 B1* | 9/2013 | Tantiprasut | G06Q 10/06 715/751 |
| 8,713,436 B2 | 4/2014 | Cheng et al. | |
| | | (Continued) | |

FOREIGN PATENT DOCUMENTS

WO   2015/065356 A1   5/2015

OTHER PUBLICATIONS

"Assigning System Center Orchestrator Runbooks Permissions", Retrieved at https://docs.flexera.com/appportal2017/Content/helplibrary/AP_ConnectMSOrch.htm, Retrieved on May 2022, 2 Pages.
(Continued)

*Primary Examiner* — Lashonda Jacobs-Burton
(74) *Attorney, Agent, or Firm* — Invoke

(57) ABSTRACT

Techniques for recommending runbook operations during a runbook generation process are disclosed. A system recommends operations for including in the runbook based on attributes of a detected event. The system presents event attributes associated with the detected event to a user in a runbook generation interface. When the user selects an event attribute, the system presents a set of candidate runbook operations associated with the event attribute. Based on user selections of runbook operations to include in a runbook, the system generates and stores a template of the runbook in which the attribute values associated with the detected event are omitted. Upon execution of the runbook at a future time, the system, or a user, may populate the event attributes in the runbook with values that correspond to the future event of the same event type.

13 Claims, 12 Drawing Sheets

Related U.S. Application Data

(60) Provisional application No. 63/261,832, filed on Sep. 29, 2021, provisional application No. 63/236,563, filed on Aug. 24, 2021, provisional application No. 63/236,561, filed on Aug. 24, 2021, provisional application No. 63/236,565, filed on Aug. 24, 2021, provisional application No. 63/236,557, filed on Aug. 24, 2021.

(51) Int. Cl.
```
G06F 9/54      (2006.01)
G06F 11/07     (2006.01)
G06F 11/30     (2006.01)
G06F 11/34     (2006.01)
G06F 11/36     (2006.01)
H04L 43/02     (2022.01)
H04L 67/00     (2022.01)
H04L 67/50     (2022.01)
```

(52) U.S. Cl.
CPC ........ *G06F 11/079* (2013.01); *G06F 11/0793* (2013.01); *G06F 11/3051* (2013.01); *G06F 11/3466* (2013.01); *G06F 11/366* (2013.01); *H04L 43/02* (2013.01); *G06F 2201/86* (2013.01); *H04L 67/00* (2013.01); *H04L 67/535* (2022.05)

(56) References Cited

U.S. PATENT DOCUMENTS

| | | | |
|---|---|---|---|
| 9,164,965 | B2 | 10/2015 | Molesky et al. |
| 9,819,547 | B2 | 11/2017 | Maini et al. |
| 9,891,971 | B1* | 2/2018 | Kuhhirte ............. G06F 11/0709 |
| 10,120,552 | B2 | 11/2018 | King et al. |
| 10,379,990 | B2 | 8/2019 | Krishnamoorthy et al. |
| 10,678,610 | B2 | 6/2020 | Ebrahimi et al. |
| 10,769,043 | B2 | 9/2020 | Sabharwal et al. |
| 10,866,872 | B1 | 12/2020 | Gudka et al. |
| 10,970,632 | B2 | 4/2021 | Sabharwal et al. |
| 11,080,121 | B2 | 8/2021 | Thornhill et al. |
| 11,550,652 | B1 | 1/2023 | Arora et al. |
| 2005/0223285 | A1* | 10/2005 | Faihe .................. G06F 11/2257 714/25 |
| 2012/0303772 | A1* | 11/2012 | Ennis ....................... G06N 5/02 709/223 |
| 2013/0090996 | A1* | 4/2013 | Stark ........................ A47F 11/06 705/14.4 |
| 2013/0103973 | A1* | 4/2013 | Werth .................. H04L 41/0816 714/2 |
| 2017/0090736 | A1* | 3/2017 | King .................... G06Q 10/101 |
| 2019/0391892 | A1* | 12/2019 | Sabharwal .......... G06F 11/2263 |
| 2019/0392310 | A1 | 12/2019 | Sabharwal et al. |
| 2020/0004618 | A1 | 1/2020 | Thornhill et al. |
| 2020/0136928 | A1* | 4/2020 | Sethi ...................... G06N 20/00 |
| 2020/0167255 | A1 | 5/2020 | Gudka et al. |
| 2020/0204428 | A1* | 6/2020 | Sasidharan ............. H04L 69/40 |
| 2021/0191769 | A1* | 6/2021 | Eschinger ............. G06F 9/5077 |
| 2021/0279160 | A1* | 9/2021 | Huang .................. G06F 3/0483 |
| 2021/0333953 | A1* | 10/2021 | Fitzgerald ............. G06F 16/248 |
| 2022/0067620 | A1* | 3/2022 | Thornhil ........ G06Q 10/063114 |
| 2022/0342796 | A1* | 10/2022 | Cui ..................... G06F 11/0772 |
| 2022/0414571 | A1 | 12/2022 | Buggins et al. |
| 2023/0034173 | A1 | 2/2023 | Russell et al. |
| 2023/0062588 | A1 | 3/2023 | Patti et al. |

OTHER PUBLICATIONS

"Automation Hybrid Runbook Worker overview", Retrieved at https://docs.microsoft.com/en-us/azure/automation/automation-hybrid-runbook-worker, Retrieved on Apr. 29, 2022, 11 Pages.

"AWS Systems Manager Automation", Retrieved at https://docs.aws.amazon.com/systems-manager/latest/userguide/systems-manager-automation.html, Retrieved at May 2022, 4 Pages.

"Build & Run Remediation Runbook", Retrieved at https://wellarchitectedlabs.com/operational-excellence/200_labs/200_automating_operations_with_playbooks_and_runbooks/4_build_run_remediation_runbook/, Retrieved on May 2022, 9 Pages.

"Complex deployments made easy", Retrieved at https://octopus.com/, Retrieved on May 2022, 6 Pages.

"Configure runbook output and message streams", Retrieved at https://docs.microsoft.com/en-us/azure/automation/automation-runbook-output-and-messages, Jul. 10, 2021, 17 Pages.

"Datasheet-NetBrain-Integrated-Edition-7.0", Retrieved at https://www.netbraintech.com/wp-content/uploads/2017/09/Datasheet-NetBrain-Integrated-Edition-7.0.pdf, Retrieved at May 2022, 2 Pages.

"DRYiCE iAutomate v5.0", Retrieved at https://www.dryice.ai/releases/dryice-iautomate-v50, Retrieved on May 2020, 7 Pages.

"DRYiCE iAutomate" Retrieved at https://www.dryice.ai/resource/brochure/dryice-iautomate, Retrieved on May 2022, 2 Pages.

"DRYiCE iAutomate", Retrieved at https://www.dryice.ai/products-and-platforms/iautomate, Retrieved on May 2022, 7 Pages.

"Evolution of Artificial Intelligence for IT Operations", Retrieved at https://www.siliconindia.com/viewpoints/cxoinsights/evolution-of-artificial-intelligence-for-it-operations-nwid-10000.html, Retrieved on May 2022, 4 Pages.

"HCL Hero—Workload Automation", Retrieved at https://solutions.hcldoc.com/HCL_HERO/!SSL!/Responsive_HTML5/Overview/Product_Overview.htm, Retrieved on May 2022, 2 Pages.

"How a Simple Misconfiguration Can Ruin Everyone's Day—NetBrain", Retrieved at https://www.netbraintech.com/blog/human-error-the-forgotten-single-point-of-failure/, Apr. 28, 2017, 7 Pages.

"IBM Runbook Automation and IBM Alert Notification deliver more agile, automated operations management", Retrieved at https://www.ibm.com/common/ssi/ShowDoc.wss?docURL=/common/ssi/rep_ca/1/897/ENUS216-031/index.html, Feb. 16, 2016, 16 Pages.

"IBM Runbook Automation Guide", Retrieved at https://webcache.googleusercontent.com/search?q=cache:jZ5yusTVFAEJ:https://www.ibm.com/support/knowledgecenter/SSZQDR/com.ibm.rba.doc/rba_pdf_guide.pdf+&cd=11&hl=en&ct=clnk&gl=in, Retrieved on May 2022, 138 Pages.

"Manage role permissions and security in Automation", Retrieved at https://docs.microsoft.com/en-us/azure/automation/automation-role-based-access-control, Sep. 26, 2021, 30 Pages.

"Microsoft Azure Automation _ Netreo", Retrieved at https://www.netreo.com/wpsandbox/solutions/microsoft-azure-automation/, Retrieved at May 2022, 5 Pages.

"Octopus Deploy 2019.11: Operations Runbooks RTW", Retrieved at https://octopus.com/blog/octopus-release-2019.11, Dec. 18, 2019, 4 Pages.

"Octopus Deploy Documentation—Runbooks", Retrieved at https://octopus.com/docs/runbooks, Retrieved on May 2022, 2 Pages.

"Runbook Automation (Rundeck)", Retrieved at https://www.pagerduty.com/resources/learn/aiops-incident-management-2021/, Retrieved on May 2022, 8 Pages.

"Runbooks permissions", Retrieved at https://octopus.com/docs/runbooks/runbook-permissions, Retrieved at May 2022, 2 Pages.

"The Guide to Automating Runbook Execution—Shoreline", Retrieved at https://shoreline.io/blog/the-guide-to-automating-runbook-execution, Feb. 25, 2021, 9 Pages.

"Troubleshoot Azure Automation runbook issues _ Microsoft Docs", Retrieved at https://docs.microsoft.com/en-us/azure/automation/troubleshoot/runbooks, Sep. 24, 2021, 26 Pages.

"Use runbooks to automate operations activities", Retrieved at https://www.ibm.com/garage/method/practices/manage/runbooks-to-automate-operations/, Retrieved on May 2022, 9 Pages.

"What is Azure Automation Management—Netreo Newtork Monirotting Tool", Retrieved at https://www.netreo.com/cloud-automation/what-is-azure-automation-management/, Sep. 9, 2015, 2 Pages.

"What is Runbook Automation?", Retrieved at https://www.rundeck.com/what-is-runbook-automation, Retrieved on May 2022, 10 Pages.

\* cited by examiner

ND RUNBOOK OPERATION
RECOMMENDATIONS

Each of the following applications are hereby incorporated by reference: U.S. application Ser. No. 17/725,143, filed on Apr. 20, 2022; Application 63/262,832 filed on Sep. 29, 2021; U.S. Provisional Patent Application 63,236,557, filed Aug. 24, 2021, U.S. Provisional Patent Application 63/236,561, filed Aug. 24, 2021; U.S. Provisional Patent Application 63/236,563, filed Aug. 24, 2021; U.S. Provisional Patent Application 63/236,565, filed Aug. 24, 2021.

This application further incorporates by reference, in their entirety, U.S. Pat. Nos. 9,164,965, 10,379,990, and 10,678,610.

The Applicant hereby rescinds any disclaimer of claim scope in the parent application(s) or the prosecution history thereof and advises the USPTO that the claims in this application may be broader than any claim in the parent application(s).

TECHNICAL FIELD

The present disclosure relates to runbooks. In particular, the present disclosure relates to recommending runbook operations during a runbook generation process.

BACKGROUND

Modern information technology systems include a large number of different types of components. For example, there may be database systems, network systems, computer applications, and the like. Each such system may be administered and/or monitored by specialized IT professionals.

During normal operation, a computer system may produce or encounter behavior or results that are not expected or desired by the operators monitoring the system. Such behavior or results may generate event records (for example, process is running slow, or process is stalled). Upon encountering an event log or incident message, a user may wish to resolve the issue by executing one or more remediation tasks. A user may execute remediation tasks to address an event as defined by a runbook. Alternatively, or in addition, the user may execute remediation tasks defined by a runbook to address a user-perceived issue that did not generate an event.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

The embodiments are illustrated by way of example and not by way of limitation in the figures of the accompanying drawings. It should be noted that references to "an" or "one" embodiment in this disclosure are not necessarily to the same embodiment, and they mean at least one. In the drawings.

DETAILED DESCRIPTION

Figure 1:
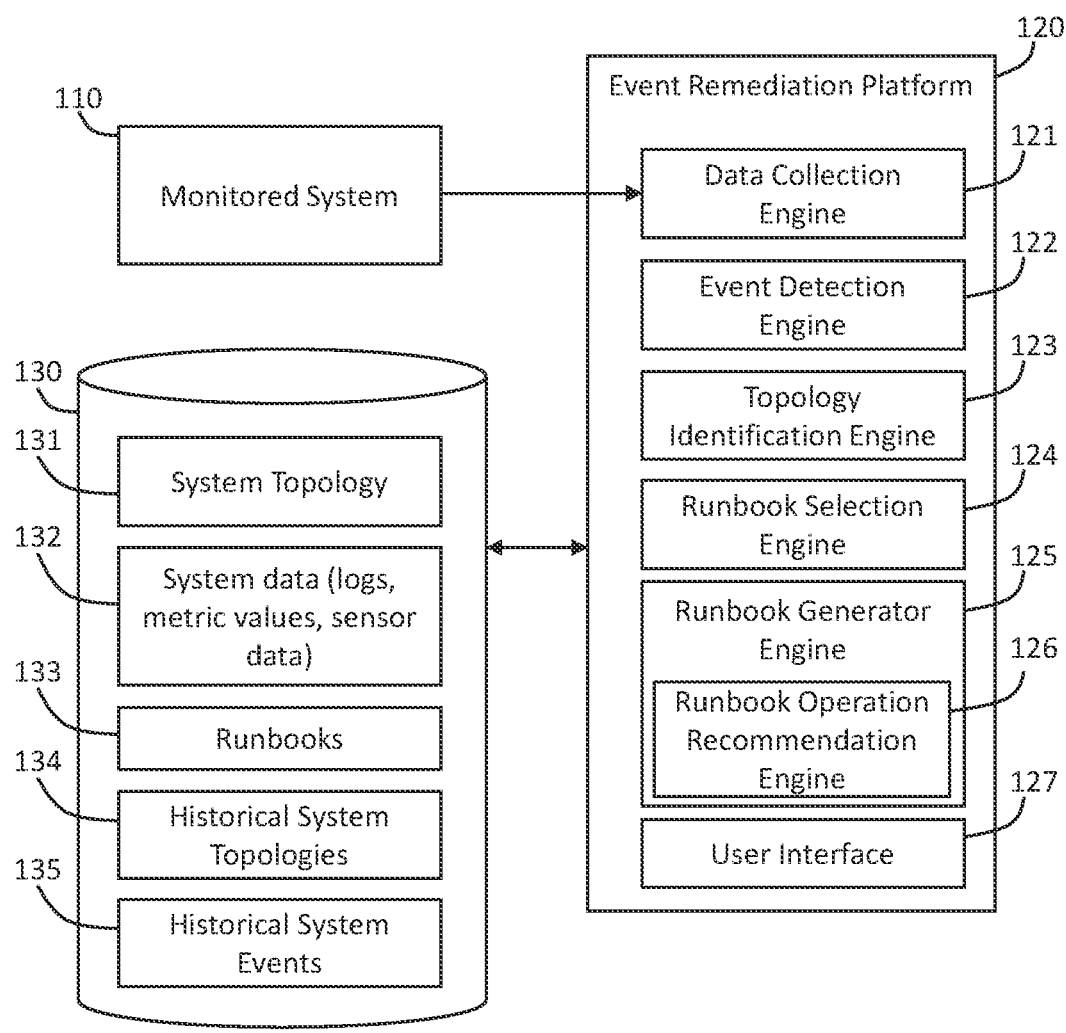
FIG. 1 illustrates a system in accordance with one or more embodiments.

In the following description, for the purposes of explanation, numerous specific details are set forth in order to provide a thorough understanding. One or more embodiments may be practiced without these specific details. Features described in one embodiment may be combined with features described in a different embodiment. In some examples, well-known structures and devices are described with reference to a block diagram form in order to avoid unnecessarily obscuring the present invention.

1. GENERAL OVERVIEW
2. SYSTEM ARCHITECTURE
3. RECOMMENDING OPERATIONS FOR A RUNBOOK DURING RUNBOOK GENERATION
4. TRAINING A MACHINE LEARNING MODEL
5. EXAMPLE RUNBOOK OPERATIONS
6. EXAMPLE EMBODIMENTS
7. COMPUTER NETWORKS AND CLOUD NETWORKS
8. MISCELLANEOUS; EXTENSIONS
9. HARDWARE OVERVIEW

1. General Overview

A runbook defines a set of independently executable operations or steps. In an example, a runbook defines operations for diagnosing and remediating an issue. The set of diagnosis and remediation operations may be used to diagnose a problem, an undesired event, undesired behavior, and/or user-perceived issue. The set of diagnosis and remediation operations may fix the problem, address the undesired event/behavior, and/or obtain more event data for further analysis by a user.

A user may initiate the execution of an operation by a runbook without initiating execution of other operations of the same runbook. Runbook operations may or may not be executed in a same order as included in the runbook. A runbook operation may be executable by a machine(s) without any additional user input subsequent to an initial input that initiates the execution of the operation. Alternatively, a runbook operation may require additional user input subsequent to the initial input that initiates the execution of the operation.

One or more embodiments recommend runbook operations to include in a runbook. The system recommends runbook operations via a runbook generation interface. The runbook generation interface accepts user input selecting one or more of the recommended operations for including in the runbook. The runbook generation interface may further accept user input (e.g., a text string input) that manually defines a runbook operation. The runbook generation interface may suggest a completion or modification for an operation being defined manually via user input. In an example, the system may suggest a target for execution of an operation being defined via user input.

One or more embodiments present event attributes during the runbook generation process as candidate targets for the application of a runbook operation selected by a user. The event attributes may be associated with a detected event. The detected event as referred to herein may include a live event that has been, or is being, detected. The detected event may include a prior event that was previously detected. The detected event may refer to information in a live data feed that is perceived as an issue-to-be-diagnosed by a user. The detected event may include information in a live data feed that triggers an alert by a monitoring platform. The event attributes corresponding to an event may include additional information, metrics, data, analysis, affected components, or feedback related to the event.

The selected runbook operation may be applicable to a multitude of different types of event attributes. The system identifies an overlap between (a) the event attributes applicable to the selected runbook operation and (b) event attributes corresponding to an event that is of an event type that is to be addressed by the runbook being authored via the runbook generation interface. The system presents the overlapping set of event attributes as candidate targets for the application of a runbook operation. The system may present attribute names and/or attribute values corresponding to the event for user selection. When the system receives user input selecting an event attribute, the system generates a runbook operation applicable to the event attribute for inclusion in the runbook.

One or more embodiments present candidate operations applicable to a user-selected event attribute. The system identifies an event(s) of an event type that is to be addressed by a runbook being authored in a runbook generation process. The event attributes of the event are presented for selection to a user. When a user selects a particular event attribute of the event, the system identifies operation(s) that may be applied to the particular event attribute. The applicable operations are then presented as candidate operations for including in the runbook. When the system receives user input selecting one of the candidate operations, the system updates the runbook with the selected candidate operation and the particular event attribute.

One or more embodiments present sample output of a runbook operation based on event data. The system applies a user-selected operation to an event to generate a result such as an analysis, an illustration, a computation, or a resulting dataset. The result is presented via the runbook generation interface as a sample of the type of output generated by the operation. The sample output helps a user determine whether or not to include the operation in the runbook.

For example, when a user initially selects an event attribute of a detected event (e.g., CPU usage), the system may recommend a runbook operation that uses the user-selected attribute (e.g., compare current CPU usage to average CPU usage range). In response to the user selecting the recommended runbook operation, the system may display the results of the runbook operation based on the live data (e.g., a graph comparing current CPU usage to average CPU usage range). The user may then choose to include the recommended runbook operation in the runbook.)

One or more embodiments present candidate runbook operations during the runbook generation process based on user activity. User activity may identify data that has been accessed by a user. User activity may identify applications or processes that have been accessed by a user. User activity may identify operations or tasks the user has performed or caused to be performed.

In an example, the system determines that an Information Technology (IT) team member is authoring a runbook. The system further identifies a particular scan that the IT team member executes on a periodic basis to keep systems secure and well-maintained. Based on the IT team member's periodic execution of the scan, the system recommends the scan as an operation in a runbook being authored by the IT team member. Accordingly, the system may recommend operations for a runbook based on the runbook author's day-to-day activity.

In another example, a runbook is being authored for use in addressing a particular issue. The system selects user activity that identifies a particular set of metrics that were viewed by one or more users when the particular issue was previously detected. Based on the user activity, the system recommends a runbook operation to retrieve the particular set of metrics in the runbook for addressing the particular issue. Accordingly, the recommendation is based on both user activity and the issue/event being addressed. The system may further recommend operations, for resolving an issue, which have been executed previously for successful resolution of the issue.

One or more embodiments recommend runbook operations by applying a machine learning model to runbook data. A runbook author may select two particular runbook operations to include in a runbook. The machine learning model recommends a third runbook operation to include in the runbook based on the two particular runbook operations selected by the user. The machine learning model may be trained to identify correlations among runbook operations, users, events, and system topology. One or more embodiments train a machine learning model based on a dataset including previously-created runbooks, previously-executed runbooks, user feedback associated with the success rate of implementing a runbook, and sets of operations included in previously-created runbooks.

One or more embodiments described in this Specification and/or recited in the claims may not be included in this General Overview section.

2. System Architecture

FIG. 1 illustrates a system 100 in accordance with one or more embodiments. As illustrated in FIG. 1, system 100 includes a system 110 being monitored, an event remediation platform 120, and a data repository 130. In one or more embodiments, the system 100 may include more or fewer components than the components illustrated in FIG. 1. The components illustrated in FIG. 1 may be local to or remote from each other. The components illustrated in FIG. 1 may be implemented in software and/or hardware. Each component may be distributed over multiple applications and/or machines. Multiple components may be combined into one application and/or machine. Operations described with respect to one component may instead be performed by another component.

Additional embodiments and/or examples relating to computer networks are described below in Section 6, titled "Computer Networks and Cloud Networks."

In one or more embodiments, a data repository 130 is any type of storage unit and/or device (e.g., a file system, database, collection of tables, or any other storage mechanism) for storing data. Further, a data repository 130 may include multiple different storage units and/or devices. The multiple different storage units and/or devices may or may not be of the same type or located at the same physical site. Further, a data repository 130 may be implemented or may execute on the same computing system as the event remediation platform 120. Alternatively, or additionally, a data repository 130 may be implemented or executed on a computing system separate from the event remediation platform 120. A data repository 130 may be communicatively coupled to the event remediation platform 120 via a direct connection or via a network.

Information describing a system topology 131, system data 132, runbooks 133, historical system topologies 134, and historical system events 135 may be implemented across any of components within the system 100. However, this information is illustrated within the data repository 104 for purposes of clarity and explanation.

In one or more embodiments, the event remediation platform 120 refers to hardware and/or software configured to perform operations described herein for recommending runbooks to remediate detected events. Examples of operations for recommending runbooks to remediate detected events are described below with reference to FIG. 2.

In an embodiment, the event remediation platform 120 is implemented on one or more digital devices. The term "digital device" refers to any hardware device that includes a processor. A digital device may refer to a physical device executing an application or a virtual machine. Examples of digital devices include a computer, a tablet, a laptop, a desktop, a netbook, a server, a web server, a network policy server, a proxy server, a generic machine, a function-specific hardware device, a hardware router, a hardware switch, a hardware firewall, a hardware firewall, a hardware network address translator (NAT), a hardware load balancer, a mainframe, a television, a content receiver, a set-top box, a printer, a mobile handset, a smartphone, a personal digital assistant ("PDA"), a wireless receiver and/or transmitter, a base station, a communication management device, a router, a switch, a controller, an access point, and/or a client device.

An event remediation platform 120 includes a data collection engine 121. The data collection engine 121 collects data, such as log data, sensor data, analog and digital device status data, and program state data from a monitored system 110. The data collection engine 121 may also obtain system data 132 from a data repository 130. The system data 132 may include log data, sensor data, and metric values of system performance metrics generated by the monitored system 110.

An event detection engine 122 monitors the data obtained by the data collection engine 121 to detect an event in the system 110. For example, the event detection engine 122 may monitor activity logs generated by one or more applications running in the system 110 and sensor data generating output values based on characteristics of devices in the system 110 to detect a failure of one or more components in the system 110. Examples of events may include: a computing device failing or operating below a defined threshold, an application failing or operating below a defined threshold, access to a device or application by an unauthorized entity, data transmission rates below a defined threshold, data latency along communication channels above a defined threshold, data lost along communication channels above a defined threshold, and sensor levels monitoring system components exceeding, or failing to meet, defined thresholds.

A topology identification engine 123 identifies a topology of the monitored system 110. The topology includes the physical components and interconnections among the physical components. Examples of physical components that make up system topologies include computing devices, communication channels connecting the computing devices, power supplies, power channels, device storage fixtures, cooling components, and system monitoring components. The topology also includes applications running on the physical components, configurations of sub-components and software on the physical components, and data stored by the physical components. For example, the topology identification engine 123 may identify as a part of a system 110 topology a database storing data type A and data type B associated with two different tenants, a server connected to the database to allow access to the database, applications running on virtual machines hosted by the server to perform queries to the database, communication channels between the server and database, and power channels from a power supply to the server and the database. The topology identification engine 123 identifies the components of the system topology 131 based on one or both of user input via a user interface 127 and detecting, without user input, attributes of system components. For example, in a cloud-based system, users may select components to be included in a computing environment. The topology identification engine 123 may identify the user selections and the cloud-maintained physical devices (e.g., remote devices maintained by a cloud environment management entity) associated with the user selections. The system may detect when a new device is added to the cloud environment via communication protocols, for example, without receiving user input to perform the detection of the new device. For example, a cloud environment management entity may connect a firewall device to a server associated with a user selection. The topology identification engine 123 may identify, without user prompting, characteristics of the firewall device, such as port information, applications running on the firewall device, cloud devices connected to the firewall device, etc. According to one embodiment, the topology identification engine 123 adds newly-detected devices, applications running on devices, and other detected hardware, to the system topology 131.

A runbook selection engine 124 performs operations to select a runbook to diagnose and/or remediate a detected event. The runbook selection engine 124 identifies candidate runbooks, from among the stored runbooks 133, associated with a detected event. For example, if an event includes a description "application crash," the runbook selection engine 124 may identify ten different runbooks 133 that include the description "application crash."

According to one or more embodiments, the runbook selection engine 124 includes a graphical user interface (GUI) generator to display a GUI on the user interface 127. The GUI may include a runbook selection interface. The runbook selection interface may display an event and one or more recommended runbooks for remediating the event. Based on a user selection of an event, the system may identify candidate runbooks associated with the event. The system executes operations associated with steps of the candidate runbooks to determine which runbooks, among the candidate runbooks, to display on the runbook selection interface as recommendations for remediating the selected event.

The event remediation platform 120 may display one or more runbooks for selection by a user via the user interface 127. In addition, selecting a runbook causes the system to display, via the user interface 127, steps of the runbook. In one or more embodiments, interface 127 refers to hardware and/or software configured to facilitate communications between a user and the event remediation platform 120. Interface 127 renders user interface elements and receives input via user interface elements. Examples of interfaces include a graphical user interface (GUI), a command line interface (CLI), a haptic interface, and a voice command interface. Examples of user interface elements include checkboxes, radio buttons, dropdown lists, list boxes, buttons, toggles, text fields, date and time selectors, command lines, sliders, pages, and forms.

In an embodiment, different components of interface 127 are specified in different languages. The behavior of user interface elements is specified in a dynamic programming language, such as JavaScript. The content of user interface elements is specified in a markup language, such as hypertext markup language (HTML) or XML User Interface Language (XUL). The layout of user interface elements is specified in a style sheet language, such as Cascading Style Sheets (CSS). Alternatively, interface 127 is specified in one or more other languages, such as Java, C, or C++.

The event remediation platform 120 includes a runbook generator engine 125. The runbook generator engine 125 generates a GUI to allow a user to create a runbook. The runbook generator engine 125 includes a runbook operation recommendation engine 126. The runbook operation recommendation engine 126 analyzes metadata associated with one or both of an author of a runbook and an event to recommend operations or steps to include in a runbook that is being generated by the author. For example, the runbook operation recommendation engine 126 may recommend runbook operations to include in a runbook being created based on an author's previous runbooks or interactions with system components. The runbook operation recommendation engine 126 may recommend runbook operations based on patterns of operations in the runbook being generated. The runbook operation recommendation engine 126 may recommend runbook operations based on an event selected by an author. For example, the runbook operation recommendation engine 126 may identify runbook operations associated with an event or operations previously used in other runbooks to remediate a similar event.

3. Recommending Operations for a Runbook During Runbook Generation

Figure 2A:
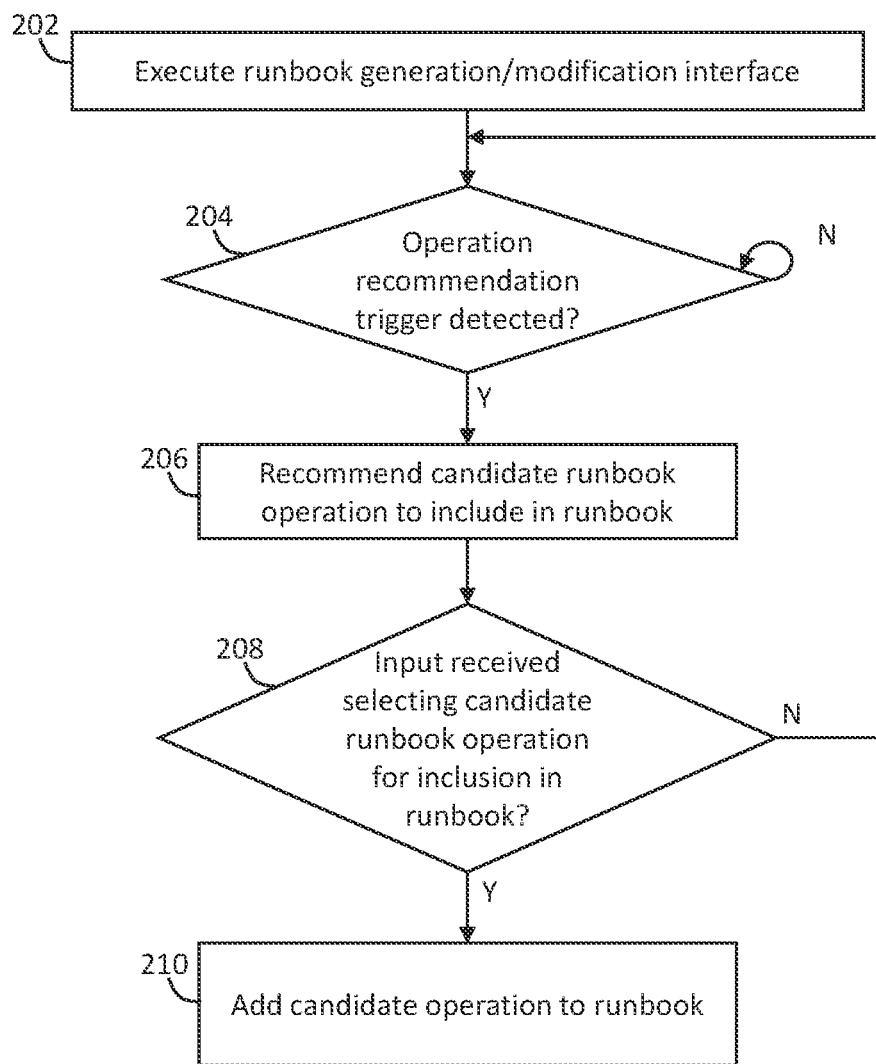
FIG. 2A illustrates an example set of operations for recommending runbook operations in accordance with one or more embodiments.

FIG. 2A illustrates an example set of operations for recommending runbook operations during runbook generation in accordance with one or more embodiments. One or more operations illustrated in FIG. 2A may be modified, rearranged, or omitted all together. Accordingly, the particular sequence of operations illustrated in FIG. 2A should not be construed as limiting the scope of one or more embodiments.

A runbook management system may be configured to present a runbook generation/modification interface including functionality for creating and modifying one or more runbooks (Operation 202). Each runbook is made up of a set of steps. Each step includes one or more independently executable operations. In other words, a user may execute certain operations of a runbook without executing certain other operations of the same runbook. Some operations of a runbook generated using the runbook generation interface may be executed in any sequence. Other operations of the runbook may be required to be executed in a particular sequence.

The runbook generation interface may be configured to present one or more user interface (UI) items that enable selection, view, and execution of runbook operations. For example, the runbook generation interface may enable a user to see a list of runbook operations and also actually execute each runbook operation, individually or as part of an execution of some or all of the runbook operations. According to an alternative, the runbook generation interface may provide a UI item (e.g., a button labeled "Execute Runbook") that, if selected, executes some or all of the runbook operations in response.

The runbook generation interface may provide various types of functionality. For example, the runbook generation interface may present a blank template that a user can begin populating with runbook operations. The runbook generation interface may pre-populate a runbook generation instance with an initial operation. For example, the runbook generation interface may include, by default, a first operation for any runbook that asks the user to ensure that the user has the appropriate credentials or permissions to execute a runbook.

The runbook generation interface may provide functionality for the user to manually enter runbook operations. More specifically, the runbook generation interface may be configured to receive particular inputs related to runbook operations. For example, a runbook operation may be to review a data set. The user may manually enter information in the runbook generation interface for such an operation, such as by entering the title "review data set" and entering relevant information (e.g., data set identifiers). As a result, the runbook generation interface may include a user interface (UI) item that is titled "review data set" and provide additional UI items for the user to, for example, provide an identifier of the data set to be reviewed. Other UI items may include UI items enabling the user to add notes or comments, view data visualizations, execute this or another runbook operation, or the like. One or more embodiments also include presenting a runbook generation interface that can present recommendations of operations that can be included in a runbook that is being generated by a user.

The system determines whether a trigger is detected to cause the system to provide a recommendation for an operation to add to a runbook being created or modified (Operation 204). The trigger may be based on a user input, such as a user interaction with an interface element of a GUI.

According to one embodiment, the trigger includes a user selection of an event attribute. For example, a runbook management system may be configured to identify event data for events that occur on one or more computing devices. The system may display one or more attributes associated with one or more events. For example, the system may display an event attribute "Active Tasks" associated with an event "Application Frozen." A user may trigger a system recommendation of a runbook operation by selecting an interface element associated with the event attribute "Active Tasks."

According to another example, a user selection of an interface element associated with an event, rather than specific event attributes, may trigger the system recommendation of one or more operations. For example, a user selection of an interface element "Application Frozen" may trigger a system recommendation of one or more runbook operations to include in a runbook associated with the event.

According to another embodiment, the system identifies occurrence of an event as a runbook operation recommendation trigger. For example, upon detecting a user selection of a runbook creation interface element on a GUI, the system may detect events that have recently occurred or that have been recently addressed by the user. The system may determine that one or more detected events trigger runbook operation recommendations. Alternatively, the system may present via the GUI a set of events that have recently been remediated by the user or by another user. The system may detect a user selection of a user interface element associated with one of the events. For example, the system may determine that the user accessing the runbook generation interface recently diagnosed and/or remediated an event associated with an electronically-recorded event "ticket." The "ticket" may be a record of an issue identified by a client, operator, administrator, or other user of a system as requiring attention and/or remediation. The system may generate a user interface element associated with the event that the user may select to initiate generation of a runbook associated with the event.

According to one embodiment, the system identifies a user interacting with the runbook generation/modification interface. Characteristics associated with a particular user may be a trigger to recommend an operation for a runbook. For example, one user may have a specified role to develop runbooks to address events in a monitored system. The system may recommend operations for runbooks based on determining that the particular user has initiated creation or modification of a runbook. The system may refrain from recommending operations for runbooks based on determining that another user has initiated creation of a runbook.

According to one embodiment, the system identifies user activity data as a trigger to recommend an operation to include in a runbook. A runbook author generating the runbook or another user may interact with a computer system or environment and the author's interactions may be recorded as user activity data. User activity data may identify datasets that have been accessed by a user. User activity data may identify applications or processes that have been accessed by a user. User activity data may identify operations or tasks the user has performed or caused to be performed.

One or more of the user's interactions with system components may generate activity data (e.g., resource usage logs, resource access logs, application logs, network logs, communications to other users generated by the user, etc.). Generally, the user may interact with any software system component or hardware system component in a manner that generates activity records, logs, or other data that is then accessible to the runbook management system.

User activity, captured in the user activity data, may include the user creating or editing a data set or database. The user activity may include the user initiating or participating in a process, such as installing an application on a computing device. The user may interact with an application that is installed on a computing device. As a more specific example, an application installed on one or more computing devices in the computing environment may be configured to perform encryption and/or decryption functionality. The application may use keys to encrypt or decrypt data. The user may have access to add, remove, or modify such encryption/decryption keys. An example of user activity with respect to the application may include the user changing a decryption key used by the application.

In another example, the user activity data may indicate a user reviewed metrics corresponding to a process that executed on a computer system. The user activity data may indicate that the user executed a particular scan or check on a system periodically (e.g., as part of a system health check). As another example, the user activity data may indicate the user performed a periodic data update (e.g., run a scheduled task to delete data older than a certain point in time from a database).

According to another embodiment, the system identifies a sequence of runbook operations in a runbook that is being created or modified. The system may identify the sequence as a trigger to recommend one or more additional operations. The system may apply a machine learning model to sequences of operations already included in a runbook to identify the one or more additional operations to recommend adding to the runbook.

Based on detecting a runbook operation recommendation trigger, the system recommends a candidate runbook operation to include in the runbook (Operation 206). The system may display, via the GUI in the runbook generation and modification interface, the candidate runbook operation. The GUI may display the candidate runbook operation as a selectable user interface element. Selecting the user interface element results in the candidate operation being added to the runbook.

According to an example embodiment, the candidate operation may analyze, collect, present, modify or otherwise access a dataset accessed by the user. In an example, a metric frequently viewed by a user may be identified based on the user activity data. The candidate operation may include accessing the metric. The candidate operation may include performing a trend analysis on the metric. The candidate operation may include identifying anomalies in the metric.

The runbook operation recommendation engine may help incorporate the runbook author's knowledge and/or behavior into the runbook by suggesting runbook operations that have been periodically or frequently executed by the author. The candidate operation may correspond to an operation executed by the user on a periodic, continuous and/or frequent basis. In an example, the system analyzes the user activity data to identify a particular vulnerability scan executed by a user. Based on the user's executions of particular vulnerability scans meeting a threshold frequency, the particular vulnerability scan is selected as a candidate runbook operation.

The system may recommend runbook operations that are similar to the operations executed by a user. As an example, the system may identify the vulnerability scan executed by a user on a first resource and recommend execution of the same vulnerability scan on a different resource. In another example, the system may identify operations that have a similar functionality or goal as the operations executed by a user. The runbook operation recommendation engine does not necessarily require the identification of a relationship between the author's activity and the runbook to recommend the author's activity as an operation for the runbook. The runbook operation recommendation engine does not necessarily require the identification of a relationship between the author's activity and a problem being addressed by the runbook to recommend the author's activity as an operation for the runbook.

As another example, the runbook management system may determine that the user may be interested in the health of a system because the user executed a particular scan. Accordingly, the runbook management system may determine a candidate runbook operation to review processes involved in the system, review results of the system's operation, restart one or more processes of the system, report to another user regarding system issues or events, or execute a diagnostic check on the system.

The candidate runbook operation can be based further on an event for which a runbook is currently being authored by the user. In other words, the operations of the runbook being defined by the user may be intended to resolve a particular event, and the runbook management system may be configured to determine candidate runbook operations for resolving the event based on the user's activity data.

As described in an example above, there may be an encryption/decryption application executing on a computing device or computer system. One of the application processes, such as a decryption process, may be executing at an unusually slower pace. The system may then identify a subset of user activity data related to the decryption/encryption application. The user activity data indicates that the user recently modified the decryption key used by the decryption/encryption application. The decryption key modification may be, for example, a user-generated or system-generated configuration change to the encryption/decryption application. Based on the user activity data and the event (unusually slow decryption process), the system recommends a runbook operation to review the decryption key.

In another example, the runbook generation interface is being used to author a runbook for addressing virus infection events. Based on the runbook being generated to address virus infection events, the system queries the user activity data for security-related activity and determines that the user frequently executes application VirusDefender. The system then recommends execution of the application VirusDefender as a Runbook operation for the runbook being authored for addressing virus infection events.

The system may recommend runbook operations for a runbook addressing a particular problem that were successfully used in runbooks addressing other similar problems. The current user or some other user may have reviewed a knowledge resource while remediating an event similar to an event corresponding to the runbook being generated. The runbook management system may determine a candidate operation to review that knowledge resource based on the similarity between events.

According to one embodiment, the system applies a trained machine learning model to a set of data associated with the runbook, such as a set of operations included in the runbook. The trained machine learning model may generate a recommendation for a candidate runbook based on the set of operations already included in the runbook. The trained machine learning model may be trained based on sets of operations associated with previously created and modified runbooks.

In an embodiment, the runbook management system may be configured to present, in the runbook generation interface, one or more candidate operations as a list of recommended operations for including in a particular runbook. The list of recommended operations may be presented, for example, as a sidebar or popup menu from which the user can select one or more recommended runbook operations. The recommended operations may be presented as selectable UI items. Each selectable UI item corresponding to a recommended runbook operation may be labeled with details of the recommended runbook operation. The runbook generation interface may provide functionality for the user to select a certain recommended operation from a list of recommended operations and drag and drop the selected operation into the list of operations of the runbook the user is generating. The runbook generation interface may provide functionality for the user to click or tap on a recommended operation, resulting in the recommended operation being added to the runbook that is being generated. The runbook generation interface may provide a separate UI item (e.g., a "+" icon) that, if selected, inserts a recommended runbook operation into the currently generated runbook. Once the recommended runbook operation is included in the runbook being generated, the runbook generation interface is configured to execute the recommended runbook operation either individually or as part of an execution of some or all of the runbook operations as described above. In a related embodiment, the recommended operations may be presented as non-selectable information (e.g., a popup or textbox) that appears as a suggestion for the user. The user can then manually add the suggested operation.

The runbook management system determines whether a user input is received selecting the candidate runbook operation for including in the particular runbook (Operation 208). For example, the user may click on, drag-and-drop, tap, or otherwise select a candidate operation from the one or more candidate operations that are presented as recommendations for inclusion in the runbook that is currently being generated. As a result, the runbook generation interface may present the recommended runbook operation as part of the independently executable operations that make up the runbook that is currently being generated or modified.

In an embodiment, selection of a recommended operation for inclusion into the currently generated runbook may cause the list of recommended operations to be updated. For example, the user may encounter a slow decryption process as described above. The user may create a runbook to address this issue. The list of recommended runbook operations may include recommendations such as "Review Memory Usage", "Review CPU Utilization", "Review I/O Utilization".

As part of runbook generation, the user may select a recommended runbook operation to "Review Memory Usage" from the list of recommended runbook operations. The runbook management system may respond to the user's selection of "Review Memory Usage" by determining the user's potential approach for resolving the issue and/or determining more relevant or appropriate runbook operation recommendations to present to the user. For example, the runbook management system may determine that the user potentially considers a cause of the decryption process slowness to be high memory usage (e.g., due to a decryption key being overly complex). In view of the user's selection of the "Review Memory Usage" recommendation, the runbook management system may remove "Review CPU Utilization", "Review I/O Utilization" from the list of recommended runbook operations because these are not relevant to the user's event remediation approach. Accordingly, the runbook management system may present a new recommended operation that is more relevant to the user's intent for generating the runbook as determined by the runbook management system. For example, the runbook management system may present a new recommended runbook operation such as "Review Decryption Key."

Based on receiving a selection to add the candidate runbook operation to the particular runbook, the runbook management system adds the candidate operation to the runbook (Operation 210). As described above, the user may select a candidate operation from a plurality of candidate operations that are recommended to the user within the runbook generation interface while the user is generating the runbook. If the user selects the candidate operation and continues with runbook generation, the completed runbook will include the candidate operation and the candidate operation can be executed as part of execution of the runbook (e.g., to resolve an issue).

Figure 2B:
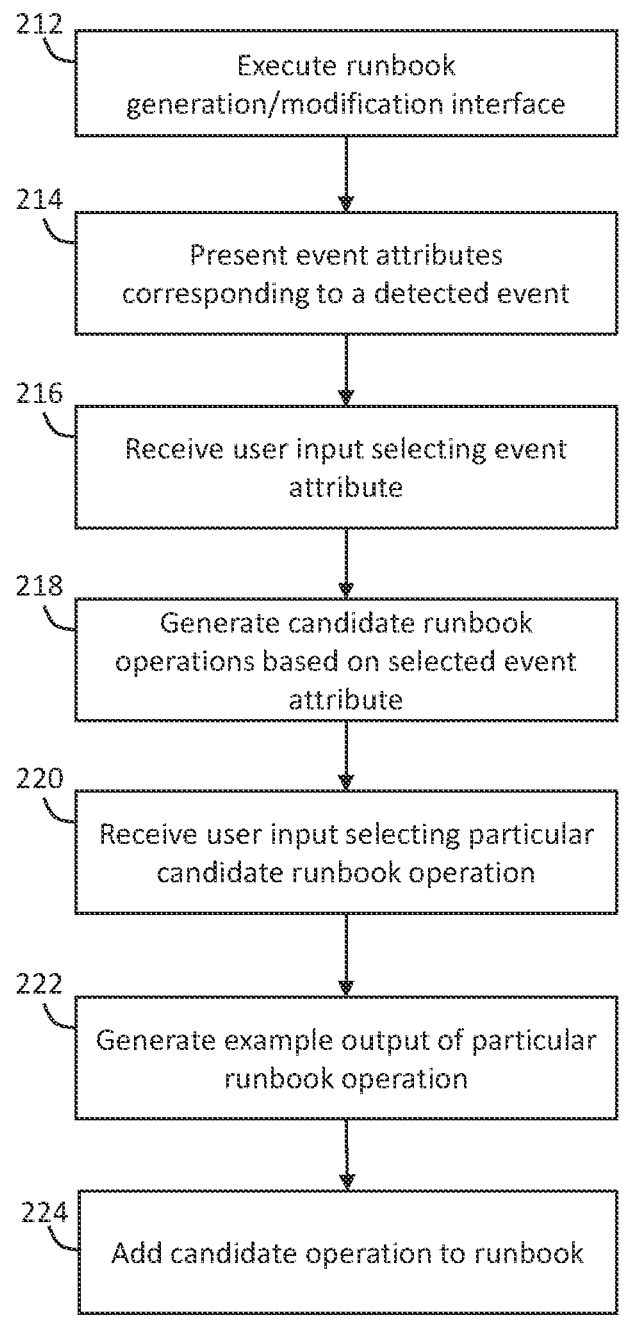
FIG. 2B illustrates an example set of operations for recommending runbook operations during runbook generation based on information from one or more detected events in accordance with one or more embodiments.

FIG. 2B illustrates an example set of operations for recommending runbook operations during runbook generation based on information from one or more detected events, in accordance with one or more embodiments. One or more operations illustrated in FIG. 2B may be modified, rearranged, or omitted all together. Accordingly, the particular sequence of operations illustrated in FIG. 2B should not be construed as limiting the scope of one or more embodiments.

As discussed above in FIG. 2A, a runbook management system may present a runbook generation/modification interface including functionality for creating and modifying one or more runbooks (Operation 212). The runbook generation interface may be configured to present one or more user interface (UI) items that enable selection, view, and execution of runbook operations.

The runbook management system presents event attributes corresponding to an event (Operation 214). The runbook management system may be configured to identify event data for events that occur on one or more computing devices, such as those devices that are communicatively coupled to the runbook management system, or devices that correspond to the same computing environment as the runbook management system. In other embodiments, the runbook management system may identify attribute data corresponding to any issue that can be remediated, addressed, or improved upon using runbook operations. For example, a user may identify an issue (such as anomalous slowness in a process) that does not trigger an event alert but nevertheless requires, or will soon require, remediation that can be provided using a runbook or one or more runbook operations. As another example, the runbook management system may obtain attributes for a particular task such as a scheduled job. The scheduled job may execute in an expected manner but runbook operations may be useful to address non-critical issues with the job's execution or optimize the job's performance. Users may provide the runbook management system with event data (or access to the event data) for events occurring on any computing device for which the users are interested in reviewing, diagnosing, and remediating events. The runbook management system obtains the event data, identifies event attributes for one or more events, and is configured to present the identified event attributes using, for example, the runbook generation interface.

In an embodiment, the runbook generation interface may be configured to present event attributes for an event that occurred prior to a current time. For example, the runbook generation interface may display event attributes for one or more events that occurred in the week prior to the user's interfacing with the runbook generation interface. Event attributes may be chosen from an event or issue of a particular type for which a runbook is to be generated. For example, the event may pertain to certain behavior on a target device (e.g., processor overheating issue, slow decryption process, virus infection, or duplicate data identified, process stalling while executing on a data set, particular error message identifier, etc.). In another embodiment, a user may wish to use the event data for a particular user-selected event. The user may provide an event identifier for the event to the runbook management system. In response, the runbook management system obtains and presents event attributes for the user-selected event.

In an example, a user may be viewing data for a particular event. The runbook management system may detect that the user is viewing that particular event, and determine its event type. The runbook management system may identify a second event of the same event type as the particular event, and obtain event attributes corresponding to the second event. The runbook management system may then present the event attributes corresponding to the second event, in the runbook generation interface. Event attributes may include, for example, event time, event date, event category, event severity or status level, event identifier(s), event reporting application identifiers, target computing devices or systems that were affected by the event, data sets affected by the event, actual behavior for applications or processes that caused generation of the event and corresponding expected behavior for those applications or processes, and user identifiers for user(s) that were involved in an application or process execution at the time/date that the second event occurred.

In an embodiment, the runbook management system receives user input selecting an event attribute of the event attributes corresponding to the event (Operation 216). The event attributes may be presented as selectable UI items. Each selectable UI item corresponding to an event attribute may be labeled with details of the event attribute.

In an embodiment, the runbook management system suggests candidate runbook operations applicable to the selected event attribute in response to the user's selection of the event attribute (Operation 218). The runbook management system may be configured to identify a number of runbook operations that can be executed using the selected event attribute. For example, an event attribute may be "data set". The runbook management system may determine that runbook operations such as "view data set", "sort data set", "remove duplicate data", "view data trends", "query data set" and so on. More specifically, the runbook management system may recommend, as runbook operations, particular queries that can be executed on a data set, if "data set" is the selected attribute.

In another example, the selected event attribute may correspond to a particular target device. Based on that, the runbook management system may determine one or more candidate operations that correspond to the target device. For example, the identified runbook operations may include "restart target device", "review processor speed of target device", "run antivirus", "review memory usage", and so on. According to yet another example, the runbook management system may determine one or more candidate operations that correspond to additional devices, separate from the target device, which may be connected or related to the target device. The runbook management system may analyze a system topology associated with a target device to identify the additional devices. For example, if a user selects an event attribute "application error," the system may identify the application running on a target device and receiving a data stream from another device. The system may recommend an operation "view application logs" that may be performed on the target device and an operation "view data transmission logs" that may be performed on the other device.

In an embodiment, the runbook management system receives a user input selecting a particular candidate runbook operation (Step 220). As described above with respect to event attributes, runbook operations may also be presented as selectable UI items. The system adds the selected runbook operation to the runbook. The system may populate one or more parameters of the selected runbook operation based on the event selected in Operation 216. The runbook operation may be completed with static information based on the selected event or partially completed and stored as a template using variables that represent values corresponding to event attributes. In an example, a runbook operation defrag and an event attribute primary_drive are selected by a user. The system generates and stores a runbook operation defrag primary_drive.

In an embodiment, the runbook operation is automatically parametrized with appropriate input variables that are auto-populated based on values of event attributes of a future event. The runbook operation stores the references to the event attributes, rather than the values, allowing the runbook management system to fill in the values in a subsequent instance of execution of the runbook operation. As an example, the runbook management system may generate a particular runbook operation scan that is to be applied to component x where component x is not known in advance. For example, the system may replace the particular server with a variable that may be populated upon running the runbook operation at a future time. The particular runbook operation may be stored in template form as scan component x. The system further stores a reference to an event attribute "data source" that corresponds to a particular event type. Thereafter, a new event of the same type is detected, resulting in generation of corresponding event attributes where the "data source" event attribute is associated with the value "classification server". The runbook is presented to the user to address the event. Furthermore, the particular operation is populated with information from the new event. Specifically, component x as referenced a template of the particular operation is replaced with classification server. The runbook operation presented within the runbook replaces scan component x (as stored in the runbook operation template) with scan classification server.

Figure 2C:
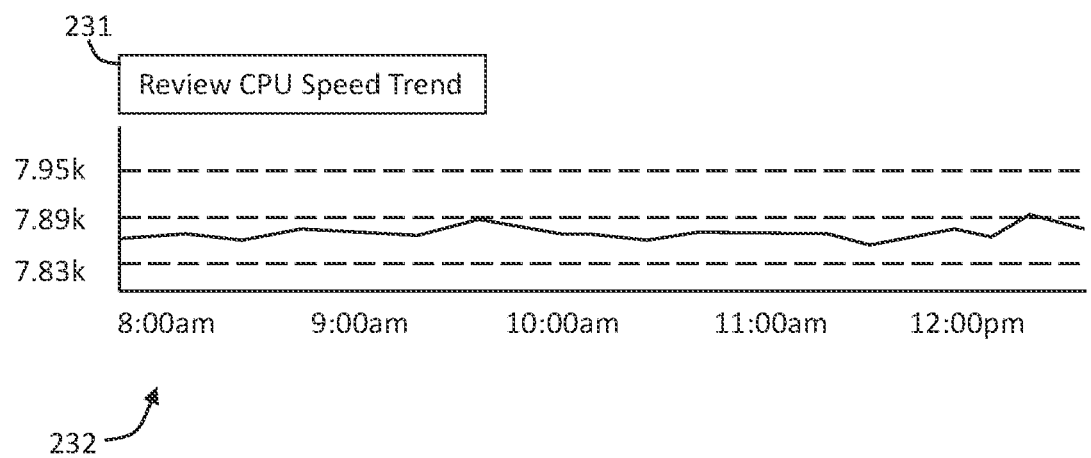
FIG. 2C illustrates an example of a graph generated based on detected event attribute values in accordance with one or more embodiments.

In an embodiment, the runbook management system generates and presents a sample output of the particular runbook operation based on event attributes corresponding to the event (Operation 222). In other words, when the user selects the runbook operation, the runbook management system executes that runbook operation and obtains an execution result. In one embodiment, the runbook management system executes the runbook operation using event data from an event. For example, the runbook management system may identify an event that is of a particular event type and then execute the user-selected runbook operation using event data of the identified event. The execution results may include, for example, metrics or values that the runbook management system displays using the runbook generation interface. For example, the runbook management system may present a table of execution result values. As another example, the runbook management system may present a visual representation, such as a graph 232 as shown in FIG. 2C. In the example embodiment illustrated in FIG. 2C, the system may display the graph 232 together with an interface element 231 associated with the candidate runbook operation "Review CPU Speed Trend." The sample output of the runbook operation execution on an event indicates, to a user, a potential result of executing that runbook operation in response to an event of the particular type. The user can review the sample output of the runbook operation execution on the event and determine whether to include the runbook operation in a runbook that the user is authoring.

In an embodiment, the runbook management system generates a runbook including the particular runbook operation (Operation 224). For example, the user may opt to include the runbook operation whose execution results were shown as described in Operation 222. The user may instruct the runbook management system to include the runbook operation in a runbook that is currently being authored. In response, the runbook management system generates a runbook with the selected runbook operation.

According to one or more embodiments, the system generates and presents to a user a new candidate runbook operation based on particular event attribute values associated with a detected event. Then, upon completion and storage of the runbook, the system may strip from the runbook operation the specific attribute values associated with the detected event. The system may store the runbook as a template to be applied to future events of the same event type as the detected event. Upon selection of the runbook at a future time, the system may populate one or more attributes with values based on the future state of the system.

For example, the system may detect that an application "Database Manager Plus!", running on a database server, shutdown in the middle of a set of queries to a database. The system may present to a user a candidate operation "check CPU trends." The system may further display a graph associated with the detected event (i.e., the shutdown of Database Manager Plus!) showing specific values for CPU usage on the database server on which the application was running. The user may select the candidate operation "check CPU trends" for inclusion in a runbook based on the CPU trends shown in the displayed graph associated with the event. Upon selecting the desired operations, the user instructs the system to store the resulting runbook associated with the detected event. When the system stores the runbook, the system stores the runbook as a template with blank values that may be populated at a later time. For example, instead of storing a specific event "Application Database Manager Plus failed", the system may store an event type "Database management application failure." Instead of storing the particular CPU values detected in association with the detected event (i.e., the shutdown of Database Manager Plus!), the system stores instructions to retrieve CPU values. When a user selects the runbook for execution at a later time, the system executes the stored instructions to (a) identify a particular application that has failed, (b) obtain CPU usage values at the future time, and (c) generate a graph of the CPU usage at the future time. Accordingly, a runbook that is authored based on attribute values associated with a live, or recent, detected event is genericized by omitting from the template attribute values specific to the detected event to create a template runbook that may be applied to other events of the same event type in the future.

4. Training A Machine Learning Model

A detailed example is described below for purposes of clarity. Components and/or operations described below should be understood as one specific example which may not be applicable to certain embodiments. Accordingly, components and/or operations described below should not be construed as limiting the scope of any of the claims.

Figure 3:
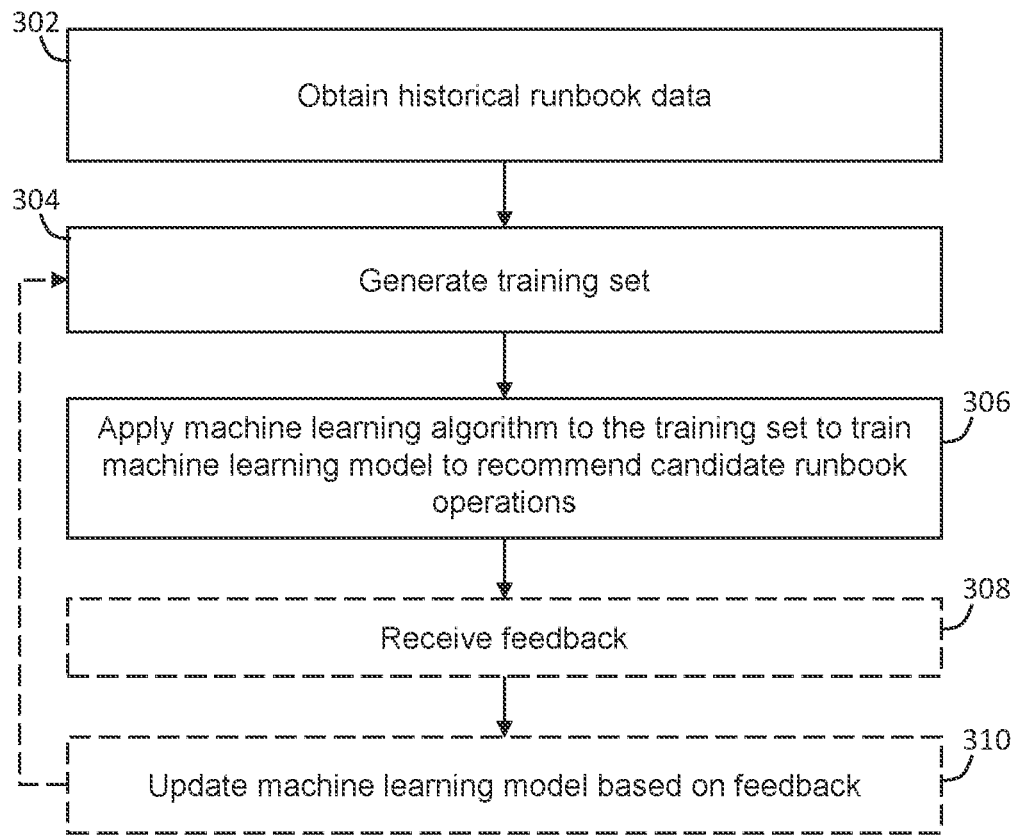
FIG. 3 illustrates an example set of operations for training a machine learning model to recommend runbook operations, in accordance with one or more embodiments.

FIG. 3 illustrates an example set of operations for training a machine learning model to generate recommendations for candidate operations for a runbook.

The method includes identifying or obtaining historical runbook data (Operation 302). Obtaining the historical runbook data may include obtaining data associated with previously generated, modified, and executed runbooks. The historical runbook data may also include data associated with the runbooks, such as authors, operators executing the runbooks, events associated with the runbooks, and topological components associated with the runbooks. Examples of historical runbook data include historical event data associated with events remediated by runbooks, historical topology data associated with runbooks, and historical user activity data specifying user interactions with one or more components or applications in connection with runbooks. For example, historical runbook data for a particular runbook may include the author, the particular operations in the runbook, a sequence in which the operations are executed by users executing the runbook, one or more users that used the runbook to remediate events in a system, a name of an event associated with the runbook, a number of times the runbook was executed to remediate events, and user feedback indicating whether particular operations in the runbook were useful towards remediating the event.

The system uses the historical runbook data to generate a set of training data (Operation 304). The set of training data includes, for sets of runbook operations, a classification label describing a candidate runbook operation associated with the set. For example, the training data identifies relationships between sets of runbook operations and an additional candidate runbook operation.

The system applies a machine learning algorithm to the training data set to perform an initial training of the machine learning model (Operation 308). The machine learning algorithm analyzes the training data set to train neurons of a neural network with particular weights and offsets to associate particular runbook data with particular runbook operations. According to one embodiment, the training data set incorporates rules for determining whether particular candidate runbook operations are "relevant" or "not relevant" to particular sets of runbook operations, particular events associated with the sets of runbook operations, and particular authors or users associated with the sets of runbook operations.

In embodiments in which the machine learning algorithm is a supervised machine learning algorithm, the system may optionally obtain feedback on the various aspects of the analysis described above (Operation 310). For example, the feedback may affirm or revise candidate runbook operations generated by the machine learning model. The machine learning model may indicate that a particular candidate runbook operation should be associated with a first set of runbook operations. The system may receive feedback indicating that the particular candidate runbook operation should not be provided as a recommendation for adding to a runbook that includes the first set of runbook operations.

5. Example Runbook Operations

According to one or more embodiments, a system recommends runbook operations, for incorporating in a runbook, directed to one or both of diagnosing a cause of an event and remediating the event. For example, a user may interact with a UI interface element corresponding to an event "lost communication to server." Operations directed to diagnosing the cause of the event may include checking power connections, checking physical data port connections, checking a communication status of an adjacent device in the system topology, and checking port configuration settings in software. Operations directed to remediating the event may include setting port configuration settings to predefined values, replacing an adjacent device that is not communicating with the server, and initiating a reboot of the server.

According to one or more embodiments, the system recommends runbook operations directed to routine operations, emergency operations, and infrastructure provisioning operations. Examples of routine operations include regularly-scheduled physical component maintenance, memory garbage-collection, software updates, virus scans, and system performance analysis. Examples of emergency operations include operations to diagnose a server failure, operations to restart a server, operations to identify a cause of corrupt data, operations to diagnose a cause of client complaints associated with system components or applications, operations to diagnose an application crash, and operations to restore application data subsequent to an application crash. Examples of infrastructure provisioning operations include operations to configure and provision cloud environments, virtual computing machines, and applications running on computing devices.

According to one or more embodiments, a system may recommend any type of runbook operation for incorporating in a runbook, including: runbook operations performed entirely by a user, without computer contribution; runbook operations described by a computer on a UI and carried out by the user based on user interaction with the UI; runbook operations initiated by a user based on a user interaction with a UI, and carried out by a computer based on the user interaction with the UI; runbook operations initiated by a computer without user initiation, based on detecting completion of a prerequisite operation (such as a computer detecting completion of a preceding step in the runbook); and runbook operations requiring performance of multiple different users.

For example, runbook operations performed entirely by a user, without computer contribution may include a user checking physical characteristics of devices. A user may check the connection states of physical wires or cables. A user may observe whether a device is damaged or mis-shaped. A user may observe whether a physical component is discolored. A user may observe the physical status of a fuse or circuit breaker. A user may observe whether a device is physically located at the correct location relative to other physical devices. A user may use a sensor device to measure characteristics of an environment or a physical object. For example, a user may measure a voltage, current, or resistance at a point in an electrical circuit. A user may measure a temperature or humidity in a room housing computing devices.

According to another example, runbook operations described by a computer on a UI and carried out by the user based on user interaction with the UI may include a user initiating a computer-based measurement or calculation by pressing a button on a UI. For example, a runbook operation may direct a user to check the values stored in a register in memory. The user may press a button "check register values" to cause the computer to retrieve and display the register values. A runbook for creating a new instance of a cloud computing environment may include an operation to "select environment template." A user may interact with a UI interface element to cause the computer to retrieve previously-stored cloud environment templates. The user may select from among the cloud environment templates to generate a new instance of a cloud environment. A runbook operation may direct a user to "update security certificates." The user may interact with the user interface element "update security certificates" to cause the computing device to communicate with servers over a network to generate a list of security certificates associated with one or more applications running on a computer that may be updated. The user may interact with the UI to select the particular security certificates to be updated.

According to another example, the system may recommend for inclusion in a runbook operations initiated by a user and carried out by a computer, based on a user interaction with a UI. For example, a runbook operation may include functions that are incapable of being performed by a human and may only be performed by a computer. Examples of operations that are only capable of being performed by a computer include: accessing and manipulating data in electronic memory, performing virus and malware scans, communicating electronically over a network, and performing complex calculations on electronic data. A runbook operation may direct a user to stop applications running on a server to allow a subsequent operation of applying a software patch to the server. A user may interact with a UI interface element "stop applications" to cause the computer to stop the applications running on the server. A runbook operation may direct a user to "apply software patch" to an application or operating system. The user may interact with a user interface element "apply software patch" to cause the computer to apply the software patch to the application or operating system. A runbook operation may direct a user to "initiate garbage collection." The user may interact with a user interface element of a UI to cause the computer to perform a garbage collection operation in a specified region of memory. A runbook operation may direct a user to "deploy cloud environment instance." The user may interact with a user interface element on a UI do direct the computer to deploy the cloud environment instance. The computer may then configure applications, tables, databases, and other system components to instantiate a new cloud environment.

According to another example, the system may recommend for inclusion in a runbook operations initiated by a computer without user initiation. For example, an event remediation platform executing on a computer may monitor a state of a system component. A user may execute a runbook operation to change the state of the system component. The computer may, without receiving user input to initiate a runbook operation, execute a subsequent runbook operation based on detecting the change of state of the system component. For example, a runbook may include two operations: reset server and restore default settings. A user may physically reset the server to perform the first operation. The event remediation platform may detect the server reset and, without user action to initiate the second operation, restore a set of default settings in an application or operating system of the server. According to another example, a computer may perform a runbook operation without detecting any user action. For example, a runbook operation to "renew security certificates for application" may not require any user operations to execute. Accordingly, the computer may initiate the application immediately upon detecting user selection of the runbook for execution. The computer may perform the operation out of sequence. For example, the runbook may include three operations that require user action. The operation to "renew security certificates for application" may be the fourth operation listed in the runbook. The computer may perform the operation to renew the security certificates for the application prior to the user performing the preceding three operations.

According to another example, the system may recommend for inclusion in a runbook operations requiring performance of multiple different users. For example, a runbook may include a first set of operations that are associated with a first authorization level. A first technician may perform the first set of operations. The runbook may include another set of operations requiring a higher authorization level. The technician may transfer the runbook to a supervisor to perform the second set of operations. As another example, access to a particular system component may be restricted to a particular work group. A user may execute a series of operations that are not associated with the particular system component. The user may transfer the runbook to the work group to complete the runbook operations associated with the particular system component. The system may recommend for inclusion in a runbook operations that require transferring ownership of the runbook among different users. Alternatively, the system may recommend for inclusion in the runbook operations that require different users to perform operations without transferring ownership from one user to another. For example, the system may include a runbook operation to "obtain database status report from database management team." The user executing the runbook may be required to send a request to another entity to obtain the report. The other entity performs operations, without necessarily having knowledge of the runbook operation, to generate the report. The user executing the report may initiate another runbook operation based on receiving the report results.

According to one or more embodiments, a system recommends runbook operations, for incorporating in a runbook, based on system topology data and/or event attributes associated with a detected event. For example, the system may detect a user selection to create a runbook associated with an application crash. The system may identify topology information including the server on which the application is running. The system may identify topological relationships including other devices connected to the server and other applications running on the server. The system may recommend for inclusion in the runbook, based on the identified topological relationship, an operation to check activity logs of another application running on the target server. The system may also recommend for inclusion in the runbook, based on the identified topological relationship, an operation to check a status of a server in direct communication with the target server.

One or more embodiments delegate execution of different operations of a runbook to different users. The runbook management system aggregates the results of different runbook operations, authorized and/or executed by different users, for presentation in a runbook execution interface.

6. Example Embodiments

Detailed examples are described below for purposes of clarity. Components and/or operations described below should be understood as one specific example which may not be applicable to certain embodiments. Accordingly, components and/or operations described below should not be construed as limiting the scope of any of the claims.

Figure 4A:
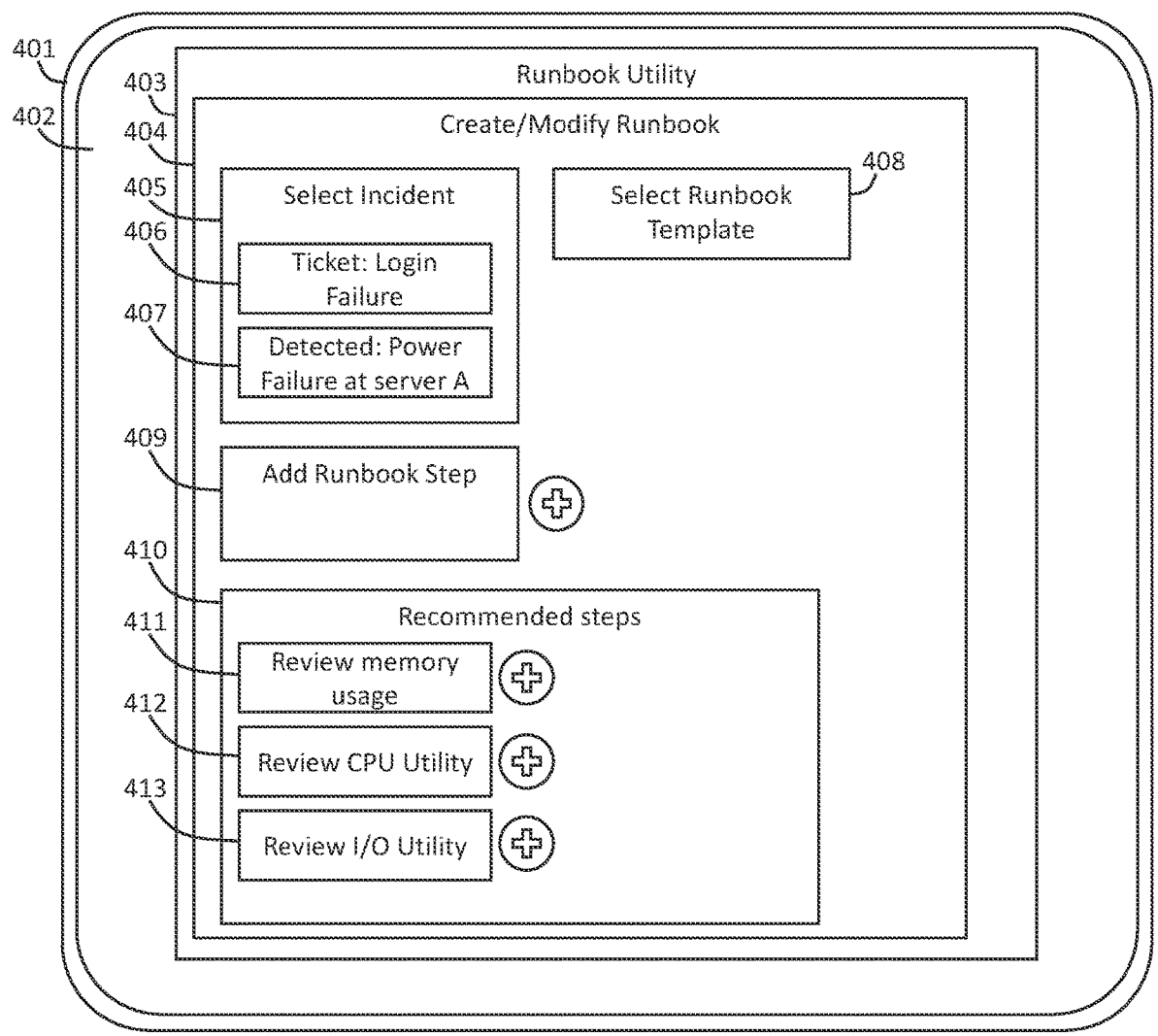
FIGS. 4A-4D illustrate an example embodiment.

FIGS. 4A-4D illustrate a system providing a recommendation for a candidate runbook operation to be included in a runbook. Referring to FIG. 4A, a display device 401 displays a graphical user interface (GUI) including a runbook utility interface 403. The runbook utility interface 403 includes a runbook creation/modification interface 404. The runbook creation/modification interface 404 includes user interface elements to allow a user to select an incident 405, select a runbook template 408, add a new runbook step 409, and select a recommended runbook step 410.

The user interface element to select an incident 405 includes an event: "Ticket: Login failure" 406 and an event: "Detected: Power failure at server A" 407. The event: "Ticket: Login failure" 406 may be generated based on a user input logging a ticket in a system in which administrators address events that arise by generating electronic tickets. The ticket may identify the user generating the ticket and any customer or user reporting the event. According to one embodiment, the ticket may include actions taken by a user to remediate the event. For example, an administrator may log steps taken to reset a user's password. Alternatively, the system may automatically log the administrator's actions to reset the user's password. The system may include the log data in the ticket when the ticket is closed and stored. The event: "Detected: Power failure at server A" 407 may be an event that was detected by a system monitoring platform. For example, sensors may detect a power failure at a particular server. The event may not have resulted in a ticket being generated. However, the system may log an administrator's actions to resolve the power failure. For example, the system may detect an administrator rebooting the server and restoring any backup data to the server. The system may record the log data associated with an electronic record of the event.

Selecting the "select runbook template" interface element 408 results in the GUI 402 displaying one or more templates selectable by a user. The templates may include commonly-executed runbook operations. The templates may be associated with events or system components. For example, a template may be named "wireless network failure" and may include one or more operations associated with components in the wireless network. A user may modify the operations, add additional operations, or remove operations to generate a particular runbook for a particular event.

Selecting the "Add runbook step" interface element 409 results in the GUI 402 presenting blank user interface elements that may be filled by a user to create a runbook step. For example, the GUI 402 may display fields including: "operation name," "component," "action to-be executed," "user/component to execute the action."

The user interface element "recommended steps" 410 includes user interface elements "review memory usage" 411, "review CPU utility" 412, and "review I/O utility" 413. As described above, a runbook management system obtains user activity and event data, selects candidate runbook operations based on the user activity and event data, and presents those candidate operations as recommended operations for inclusion in a runbook that the user is generating. The runbook management system may determine that the user's activity pertains to a particular target that is experiencing an issue. For example, the user's activity may pertain to an application server that executes an encryption/decryption application. The decryption process execution time may be higher than normal, drawing the user's attention. As a result, the user may be reviewing metrics or results associated with the decryption application server.

Based on the user's activity of reviewing data associated with the decryption application server, and/or based on event data that indicates slower decryption processing at that server, the runbook management system may determine that execution of a runbook operation may be required to remediate the slowness issue at that server. The runbook management system may recommend, for example, a runbook operation 411, corresponding to "Review Memory Usage". The user can, for example, select recommended operation 411 and include it in a runbook that the user may be generating that may be executed in order to resolve the slowness at the decryption application server.

Figure 4B:
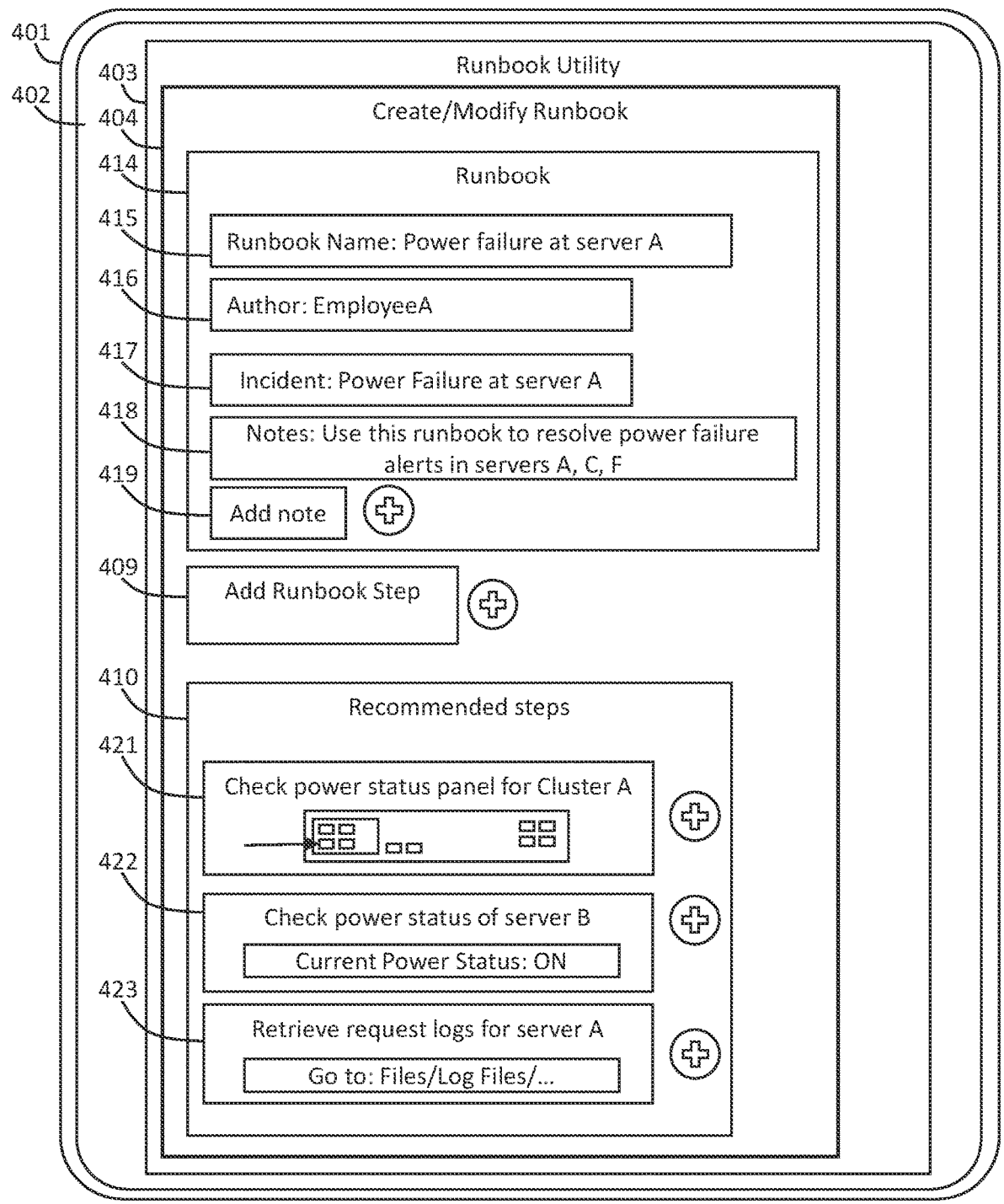

FIG. 4B illustrates a runbook 414 generated based on a user selection of the user interface element "Detected: Power failure at server A" 407 in FIG. 4A. The runbook 414 includes fields: "runbook name" 415, "author" 416, "incident" 417, and "notes" 418. The runbook 414 further includes interface elements to add a note 419, add an additional runbook step 409, and select one or more additional steps associated with the selected incident 417. In particular, referring to FIG. 4A, the system may recommend steps 411-413 based on one or more criteria including: the identity of the user accessing the runbook utility interface 403, user activity of the user accessing the runbook utility interface 403, and recent events detected or resolved in a monitored system. Once a user selects a particular event for generating a runbook, the system may modify the functionality of the runbook interface 404 to include a different set of recommended operations 421-423 that are recommended based on a different set of criteria. Specifically, the operations 421-423 may be recommended based on the selected event 407. The operations 421-423 may be recommended based on: having been previously executed associated with the same or similar events, being associated with system components that are associated with the event, being found in previously-generated runbooks associated with similar events, and detected, logged, or recorded user activity associated with the event.

Figure 4C:
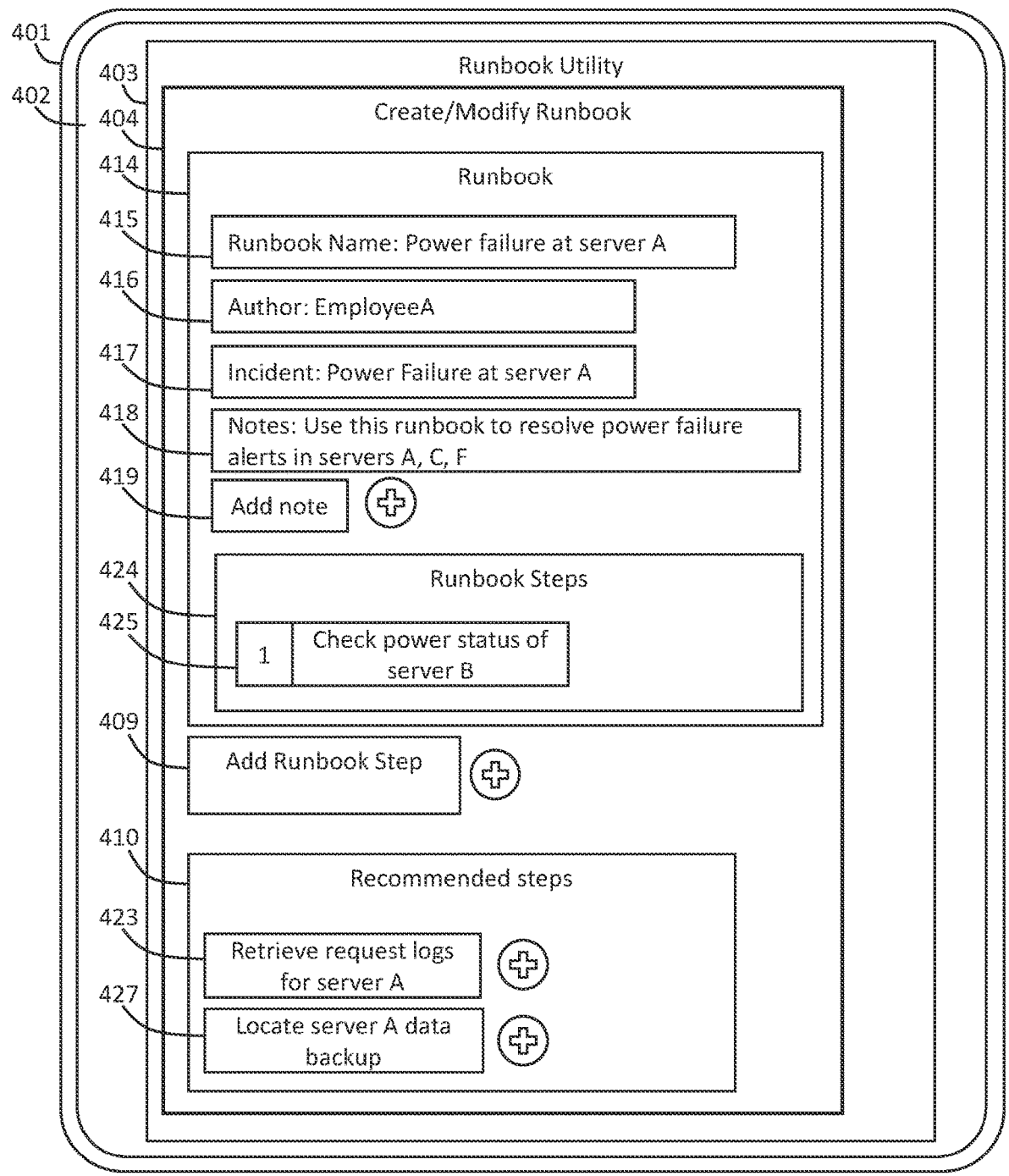

FIG. 4C illustrates modifying the runbook 414 based on receiving a selection to include the recommended operation "check power status of server B" from FIG. 4B. In particular, when a runbook author selects the operation 422 from FIG. B to be included in the runbook 414, the system (a) modifies the runbook 414 to include the user interface element 425 in a field 424 listing the runbook operations or steps, and (b) modifies the recommended steps or operations 410 based on the previously-selected operations. As illustrated in FIG. 4B, prior to selection of the operation 422, the runbook utility interface 403 displays operations 421-423 as recommended steps to include in a runbook. As illustrated in FIG. 4C, upon selection of operation 422, the runbook utility interface 403 modifies the display of the recommended steps 410 to include a new set of recommended operations 423 and 427.

According to one embodiment, the system applies a machine learning model to the runbook operation 425 to determine whether to recommend one or more additional operations. The machine learning model is trained based on runbook data, such as sets of runbook operations, to recommend candidate runbook operations. According to one embodiment, the system identifies runbook operations associated with the event "power failure at server A." The system recommends the operations 423 and 427 based on the event "power failure at server A." The system may further recommend operations 423 and 427 based on user activity data, system topology data, other runbooks generated to address similar events, and operations included in other runbooks generated by the same runbook author.

Figure 4D:
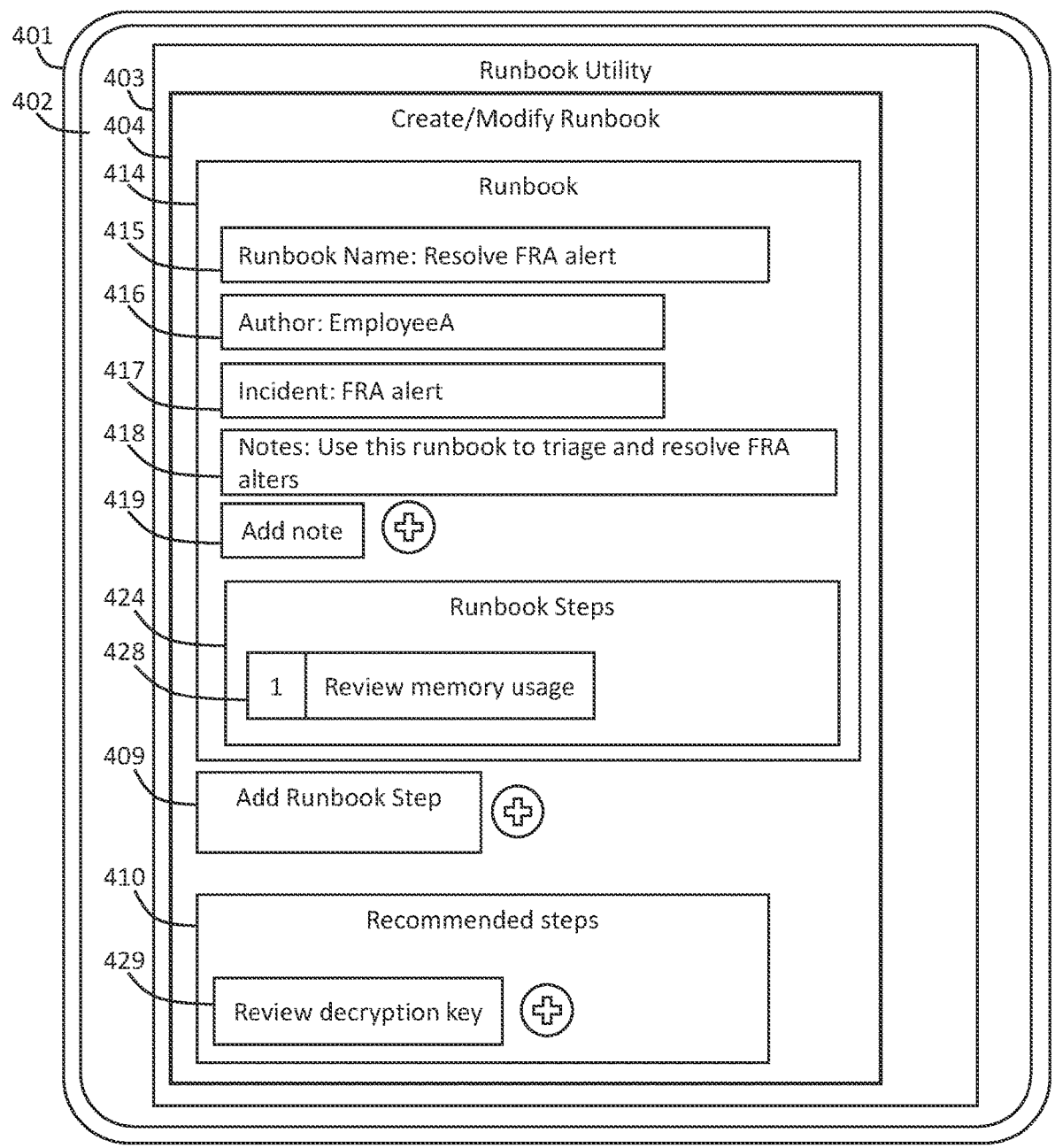

FIG. 4D illustrates a GUI 402 generated when a user selects the "review memory usage" user interface element 411 in FIG. 4A. The user interface populates the field 424 with the runbook operation "review memory usage" 428. A user may provide information for the runbook name 415, incident description 417, and notes 418. Based on detecting the user selection of the user interface element 411 associated with the operation "review memory usage," the system updates the set of recommended steps 410 to include the operation "review decryption key" 429. The system updates the list of recommended steps 410 to include operations that are relevant to the user selection. For example, the runbook management system may determine that the user considers high memory usage to be the cause of a slow decryption process. The runbook management system may determine (based on obtained user data) that the user recently changed the decryption key, and the new key may be too complex, thus consuming an abnormally high amount of computer memory resources. Accordingly, the runbook management system may recommend review of the recently changed decryption key as part of a runbook being generated to resolve the decryption process slowness.

Figure 5A:
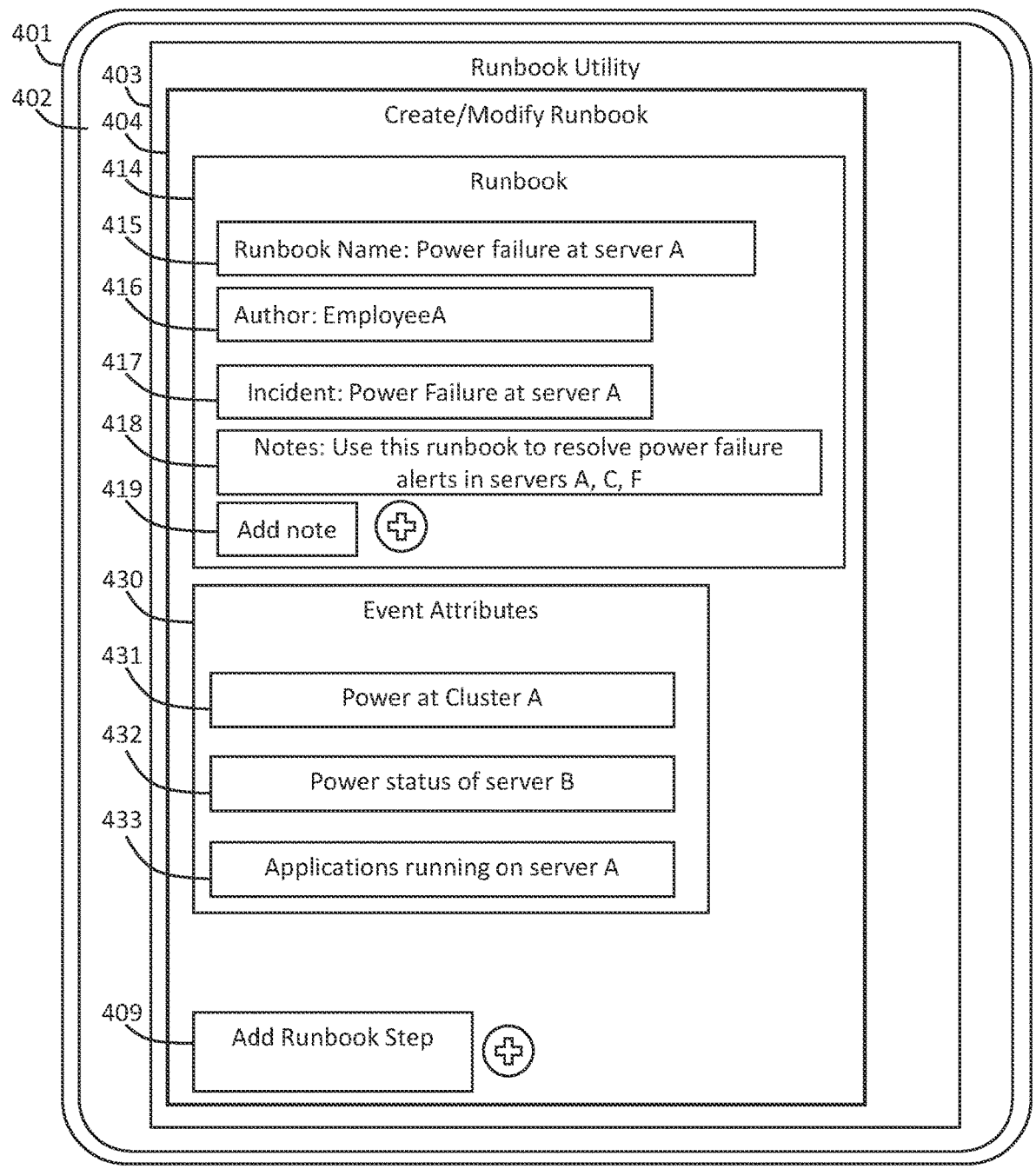
FIGS. 5A and 5B illustrate another example embodiment.

FIG. 5A illustrates a GUI 402 that may be generated when a user selects the user interface element "Detected: Power failure at server A" 407 in FIG. 4A. The GUI 402 displays a set of event attributes 430 responsive to the user selection user interface element "Detected: Power failure at server A" 407 in FIG. 4A. The event attributes 430 include "Power at Cluster A" 431, "Power status of server B" 432, and "Applications running on server A" 433.

Figure 5B:
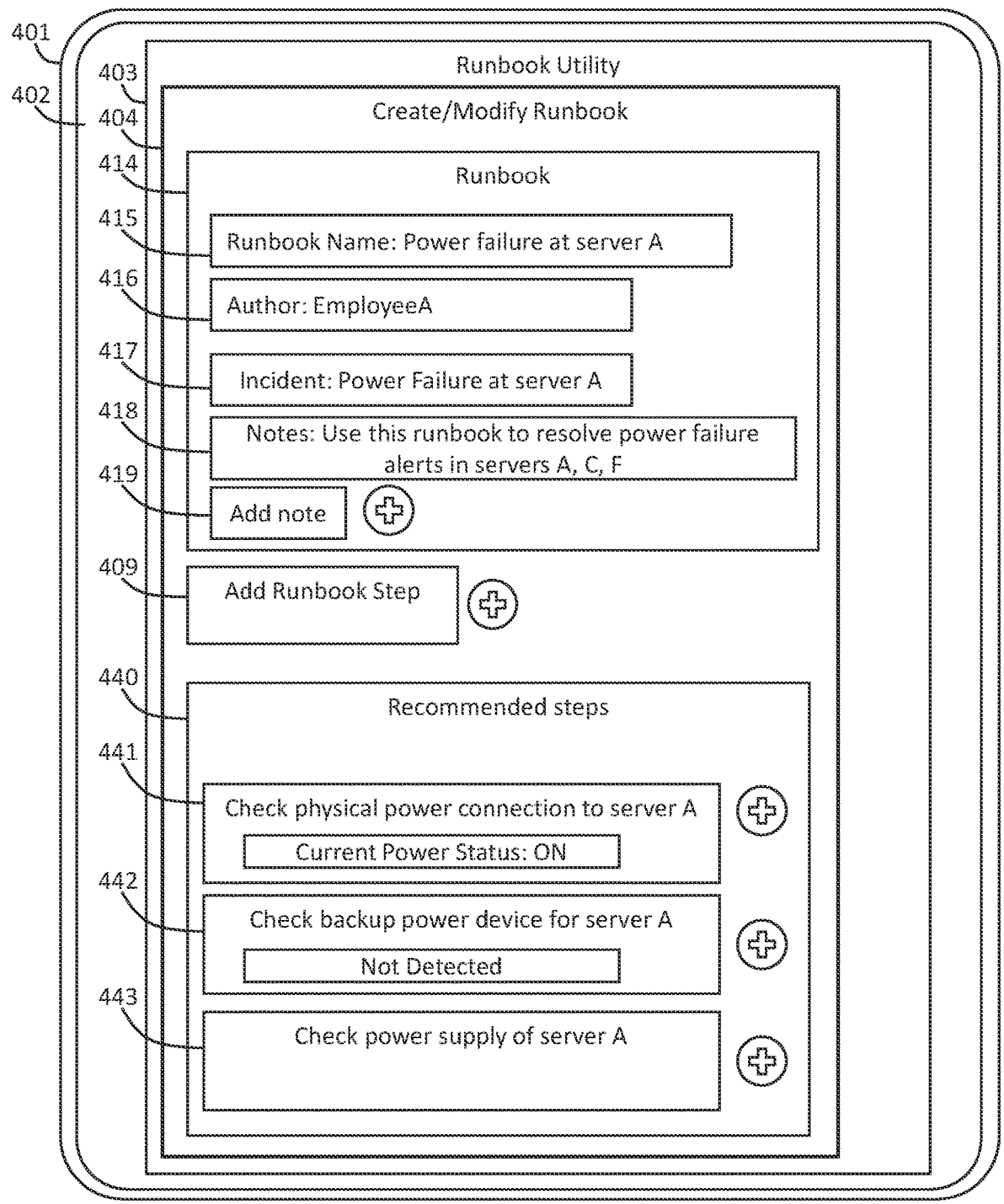

Once a user selects a particular event attribute, the system may modify the functionality of the runbook interface 404 to present a set of steps or operations 440 associated with the selected event attribute. As illustrated in FIG. 5B, the GUI 402 changes based on a user selection of the user interface element 432 associated with the event attribute "power status of server B" to present a set of recommended steps 440 associated with the selected event attribute. The recommended steps include "check physical power connection to server A" 441, "check backup power device for server A" 442, and "check power supply of server A" 443.

According to one or more embodiments, the features of FIGS. 5A and 5B may be combined with those of FIGS. 4A-4D. For example, based on a user selection of an event, the system may generate a GUI that includes both a set of recommended operations associated with the selected event and one or more event attributes. If the user selects one of the event attributes, the system may update the GUI to display another set of recommended operations based on the selected event attribute.

7. Computer Networks and Cloud Networks

In one or more embodiments, a computer network provides connectivity among a set of nodes. The nodes may be local to and/or remote from each other. The nodes are connected by a set of links. Examples of links include a coaxial cable, an unshielded twisted cable, a copper cable, an optical fiber, and a virtual link.

A subset of nodes implements the computer network. Examples of such nodes include a switch, a router, a firewall, and a network address translator (NAT). Another subset of nodes uses the computer network. Such nodes (also referred to as "hosts") may execute a client process and/or a server process. A client process makes a request for a computing service (such as, execution of a particular application, and/or storage of a particular amount of data). A server process responds by executing the requested service and/or returning corresponding data.

A computer network may be a physical network, including physical nodes connected by physical links. A physical node is any digital device. A physical node may be a function-specific hardware device, such as a hardware switch, a hardware router, a hardware firewall, and a hardware NAT. Additionally or alternatively, a physical node may be a generic machine that is configured to execute various virtual machines and/or applications performing respective functions. A physical link is a physical medium connecting two or more physical nodes. Examples of links include a coaxial cable, an unshielded twisted cable, a copper cable, and an optical fiber.

A computer network may be an overlay network. An overlay network is a logical network implemented on top of another network (such as, a physical network). Each node in an overlay network corresponds to a respective node in the underlying network. Hence, each node in an overlay network is associated with both an overlay address (to address to the overlay node) and an underlay address (to address the underlay node that implements the overlay node). An overlay node may be a digital device and/or a software process (such as, a virtual machine, an application instance, or a thread) A link that connects overlay nodes is implemented as a tunnel through the underlying network. The overlay nodes at either end of the tunnel treat the underlying multi-hop path between them as a single logical link. Tunneling is performed through encapsulation and decapsulation.

In an embodiment, a client may be local to and/or remote from a computer network. The client may access the computer network over other computer networks, such as a private network or the Internet. The client may communicate requests to the computer network using a communications protocol, such as Hypertext Transfer Protocol (HTTP). The requests are communicated through an interface, such as a client interface (such as a web browser), a program interface, or an application programming interface (API).

In an embodiment, a computer network provides connectivity between clients and network resources. Network resources include hardware and/or software configured to execute server processes. Examples of network resources include a processor, a data storage, a virtual machine, a container, and/or a software application. Network resources are shared amongst multiple clients. Clients request computing services from a computer network independently of each other. Network resources are dynamically assigned to the requests and/or clients on an on-demand basis. Network resources assigned to each request and/or client may be scaled up or down based on, for example, (a) the computing services requested by a particular client, (b) the aggregated computing services requested by a particular tenant, and/or (c) the aggregated computing services requested of the computer network. Such a computer network may be referred to as a "cloud network."

In an embodiment, a service provider provides a cloud network to one or more end users. Various service models may be implemented by the cloud network, including but not limited to Software-as-a-Service (SaaS), Platform-as-a-Service (PaaS), and Infrastructure-as-a-Service (IaaS). In SaaS, a service provider provides end users the capability to use the service provider's applications, which are executing on the network resources. In PaaS, the service provider provides end users the capability to deploy custom applications onto the network resources. The custom applications may be created using programming languages, libraries, services, and tools supported by the service provider. In IaaS, the service provider provides end users the capability to provision processing, storage, networks, and other fundamental computing resources provided by the network resources. Any arbitrary applications, including an operating system, may be deployed on the network resources.

In an embodiment, various deployment models may be implemented by a computer network, including but not limited to a private cloud, a public cloud, and a hybrid cloud. In a private cloud, network resources are provisioned for exclusive use by a particular group of one or more entities (the term "entity" as used herein refers to a corporation, organization, person, or other entity). The network resources may be local to and/or remote from the premises of the particular group of entities. In a public cloud, cloud resources are provisioned for multiple entities that are independent from each other (also referred to as "tenants" or "customers"). The computer network and the network resources thereof are accessed by clients corresponding to different tenants. Such a computer network may be referred to as a "multi-tenant computer network." Several tenants may use a same particular network resource at different times and/or at the same time. The network resources may be local to and/or remote from the premises of the tenants. In a hybrid cloud, a computer network comprises a private cloud and a public cloud. An interface between the private cloud and the public cloud allows for data and application portability. Data stored at the private cloud and data stored at the public cloud may be exchanged through the interface. Applications implemented at the private cloud and applications implemented at the public cloud may have dependencies on each other. A call from an application at the private cloud to an application at the public cloud (and vice versa) may be executed through the interface.

In an embodiment, tenants of a multi-tenant computer network are independent of each other. For example, a business or operation of one tenant may be separate from a business or operation of another tenant. Different tenants may demand different network requirements for the computer network. Examples of network requirements include processing speed, amount of data storage, security requirements, performance requirements, throughput requirements, latency requirements, resiliency requirements, Quality of Service (QoS) requirements, tenant isolation, and/or consistency. The same computer network may need to implement different network requirements demanded by different tenants.

In one or more embodiments, in a multi-tenant computer network, tenant isolation is implemented to ensure that the applications and/or data of different tenants are not shared with each other. Various tenant isolation approaches may be used.

In an embodiment, each tenant is associated with a tenant ID. Each network resource of the multi-tenant computer network is tagged with a tenant ID. A tenant is permitted access to a particular network resource only if the tenant and the particular network resources are associated with a same tenant ID.

In an embodiment, each tenant is associated with a tenant ID. Each application, implemented by the computer network, is tagged with a tenant ID. Additionally or alternatively, each data structure and/or dataset, stored by the computer network, is tagged with a tenant ID. A tenant is permitted access to a particular application, data structure, and/or dataset only if the tenant and the particular application, data structure, and/or dataset are associated with a same tenant ID.

As an example, each database implemented by a multi-tenant computer network may be tagged with a tenant ID. Only a tenant associated with the corresponding tenant ID may access data of a particular database. As another example, each entry in a database implemented by a multi-tenant computer network may be tagged with a tenant ID. Only a tenant associated with the corresponding tenant ID may access data of a particular entry. However, the database may be shared by multiple tenants.

In an embodiment, a subscription list indicates which tenants have authorization to access which applications. For each application, a list of tenant IDs of tenants authorized to access the application is stored. A tenant is permitted access to a particular application only if the tenant ID of the tenant is included in the subscription list corresponding to the particular application.

In an embodiment, network resources (such as digital devices, virtual machines, application instances, and threads) corresponding to different tenants are isolated to tenant-specific overlay networks maintained by the multi-tenant computer network. As an example, packets from any source device in a tenant overlay network may only be transmitted to other devices within the same tenant overlay network. Encapsulation tunnels are used to prohibit any transmissions from a source device on a tenant overlay network to devices in other tenant overlay networks. Specifically, the packets, received from the source device, are encapsulated within an outer packet. The outer packet is transmitted from a first encapsulation tunnel endpoint (in communication with the source device in the tenant overlay network) to a second encapsulation tunnel endpoint (in communication with the destination device in the tenant overlay network). The second encapsulation tunnel endpoint decapsulates the outer packet to obtain the original packet transmitted by the source device. The original packet is transmitted from the second encapsulation tunnel endpoint to the destination device in the same particular overlay network.

8. Miscellaneous; Extensions

Embodiments are directed to a system with one or more devices that include a hardware processor and that are configured to perform any of the operations described herein and/or recited in any of the claims below.

In an embodiment, a non-transitory computer readable storage medium comprises instructions which, when executed by one or more hardware processors, causes performance of any of the operations described herein and/or recited in any of the claims.

Any combination of the features and functionalities described herein may be used in accordance with one or more embodiments. In the foregoing specification, embodiments have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

9. Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs), field programmable gate arrays (FPGAs), or network processing units (NPUs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, FPGAs, or NPUs with custom programming to accomplish the techniques. The special-purpose computing devices may be desktop computer systems, portable computer systems, handheld devices, networking devices or any other device that incorporates hard-wired and/or program logic to implement the techniques.

Figure 6:
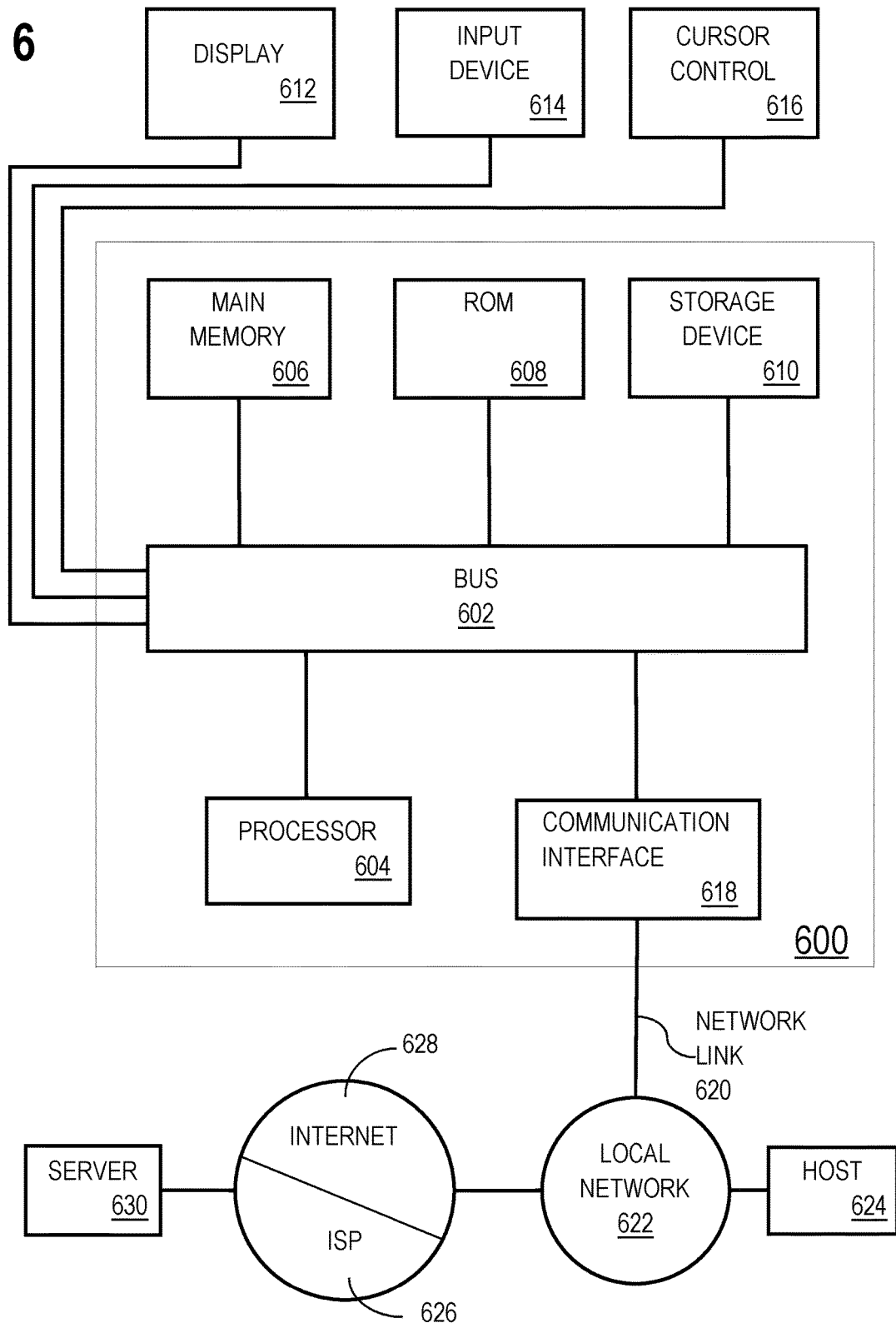
FIG. 6 shows a block diagram that illustrates a computer system in accordance with one or more embodiments.

For example, FIG. 6 is a block diagram that illustrates a computer system 600 upon which an embodiment of the invention may be implemented. Computer system 600 includes a bus 602 or other communication mechanism for communicating information, and a hardware processor 604 coupled with bus 602 for processing information. Hardware processor 604 may be, for example, a general purpose microprocessor.

Computer system 600 also includes a main memory 606, such as a random access memory (RAM) or other dynamic storage device, coupled to bus 602 for storing information and instructions to be executed by processor 604. Main memory 606 also may be used for storing temporary variables or other intermediate information during execution of instructions to be executed by processor 604. Such instructions, when stored in non-transitory storage media accessible to processor 604, render computer system 600 into a special-purpose machine that is customized to perform the operations specified in the instructions.

Computer system 600 further includes a read only memory (ROM) 608 or other static storage device coupled to bus 602 for storing static information and instructions for processor 604. A storage device 610, such as a magnetic disk or optical disk, is provided and coupled to bus 602 for storing information and instructions.

Computer system 600 may be coupled via bus 602 to a display 612, such as a cathode ray tube (CRT), for displaying information to a computer user. An input device 614, including alphanumeric and other keys, is coupled to bus 602 for communicating information and command selections to processor 604. Another type of user input device is cursor control 616, such as a mouse, a trackball, or cursor direction keys for communicating direction information and command selections to processor 604 and for controlling cursor movement on display 612. This input device typically has two degrees of freedom in two axes, a first axis (e.g., x) and a second axis (e.g., y), that allows the device to specify positions in a plane.

Computer system 600 may implement the techniques described herein using customized hard-wired logic, one or more ASICs or FPGAs, firmware and/or program logic which in combination with the computer system causes or programs computer system 600 to be a special-purpose machine. According to one embodiment, the techniques herein are performed by computer system 600 in response to processor 604 executing one or more sequences of one or more instructions contained in main memory 606. Such instructions may be read into main memory 606 from another storage medium, such as storage device 610. Execution of the sequences of instructions contained in main memory 606 causes processor 604 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical or magnetic disks, such as storage device 610. Volatile media includes dynamic memory, such as main memory 606. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, content-addressable memory (CAM), and ternary content-addressable memory (TCAM).

Storage media is distinct from but may be used in conjunction with transmission media. Transmission media participates in transferring information between storage media. For example, transmission media includes coaxial cables, copper wire and fiber optics, including the wires that comprise bus 602. Transmission media can also take the form of acoustic or light waves, such as those generated during radio-wave and infra-red data communications.

Various forms of media may be involved in carrying one or more sequences of one or more instructions to processor 604 for execution. For example, the instructions may initially be carried on a magnetic disk or solid state drive of a remote computer. The remote computer can load the instructions into its dynamic memory and send the instructions over a telephone line using a modem. A modem local to computer system 600 can receive the data on the telephone line and use an infra-red transmitter to convert the data to an infra-red signal. An infra-red detector can receive the data carried in the infra-red signal and appropriate circuitry can place the data on bus 602. Bus 602 carries the data to main memory 606, from which processor 604 retrieves and executes the instructions. The instructions received by main memory 606 may optionally be stored on storage device 610 either before or after execution by processor 604.

Computer system 600 also includes a communication interface 618 coupled to bus 602. Communication interface 618 provides a two-way data communication coupling to a network link 620 that is connected to a local network 622. For example, communication interface 618 may be an integrated services digital network (ISDN) card, cable modem, satellite modem, or a modem to provide a data communication connection to a corresponding type of telephone line. As another example, communication interface 618 may be a local area network (LAN) card to provide a data communication connection to a compatible LAN. Wireless links may also be implemented. In any such implementation, communication interface 618 sends and receives electrical, electromagnetic, or optical signals that carry digital data streams representing various types of information.

Network link 620 typically provides data communication through one or more networks to other data devices. For example, network link 620 may provide a connection through local network 622 to a host computer 624 or to data equipment operated by an Internet Service Provider (ISP) 626. ISP 626 in turn provides data communication services through the worldwide packet data communication network now commonly referred to as the "Internet" 628. Local network 622 and Internet 628 both use electrical, electromagnetic, or optical signals that carry digital data streams. The signals through the various networks and the signals on network link 620 and through communication interface 618, which carry the digital data to and from computer system 600, are example forms of transmission media.

Computer system 600 can send messages and receive data, including program code, through the network(s), network link 620 and communication interface 618. In the Internet example, a server 630 might transmit a requested code for an application program through Internet 628, ISP 626, local network 622 and communication interface 618.

The received code may be executed by processor 604 as it is received, and/or stored in storage device 610, or other non-volatile storage for later execution.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A non-transitory computer readable medium comprising instructions which, when executed by one or more hardware processors cause performance of operations comprising:
presenting a runbook generation interface including functionality for defining a plurality of runbooks, wherein each runbook of the plurality of runbooks defines a corresponding set of independently executable operations;
obtaining event attributes associated with an event of a particular event type, the event having occurred prior to presentation of the runbook generation interface;
based on the event attributes, presenting, in the runbook generation interface, a first candidate operation as a recommended operation for including in a particular runbook;
receiving user input selecting the first candidate operation for including in the particular runbook; and
generating the particular runbook comprising the first candidate operation.

2. The non-transitory computer readable medium of claim 1, wherein the operations further comprise:
subsequent to obtaining the event attributes, presenting, by the runbook generation interface, a plurality of event attributes, from among the obtained event attributes;
receiving, via the runbook generation interface, a user input selecting at least one of the plurality of event attributes;
identifying the first candidate operation as being associated with the at least one of the plurality of event attributes; and
responsive to identifying the first candidate operation as being associated with the at least one of the plurality of event attributes: presenting the first candidate operation in the runbook generation interface.

3. The non-transitory computer readable medium of claim 1, wherein the operations further comprise:
prior to obtaining the event attributes: detecting, in real-time, an occurrence of the event.

4. The non-transitory computer readable medium of claim 1, wherein presenting the first candidate operation as a recommended operation based on the event attributes comprises:
identifying a second event with a second set of event attributes that meets a similarity criteria with said event attributes associated with said event; and
determining that the first candidate operation is included in a second runbook that has been successfully used to address the second event.

5. The non-transitory computer readable medium of claim 1, wherein obtaining the event attributes comprises:
detecting a system topology associated with the event; and
obtaining the event attributes based on characteristics of components in the system topology.

6. The non-transitory computer readable medium of claim 1, wherein presenting, in the runbook generation interface, the first candidate operation as a recommended operation for including in the particular runbook includes presenting a first set of operation results associated with the first candidate operation.

7. A method comprising:
presenting a runbook generation interface including functionality for defining a plurality of runbooks, wherein each runbook of the plurality of runbooks defines a corresponding set of independently executable operations;
obtaining event attributes associated with an event of a particular event type, the event having occurred prior to presentation of the runbook generation interface;
based on the event attributes, presenting, in the runbook generation interface, a first candidate operation as a recommended operation for including in a particular runbook;
receiving user input selecting the first candidate operation for including in the particular runbook; and
generating the particular runbook comprising the first candidate operation.

8. The method of claim 7, further comprising:
subsequent to obtaining the event attributes, presenting, by the runbook generation interface, a plurality of event attributes, from among the obtained event attributes;
receiving, via the runbook generation interface, a user input selecting at least one of the plurality of event attributes;
identifying the first candidate operation as being associated with the at least one of the plurality of event attributes; and
responsive to identifying the first candidate operation as being associated with the at least one of the plurality of event attributes: presenting the first candidate operation in the runbook generation interface.

9. The method of claim 7, further comprising:
prior to obtaining the event attributes: detecting, in real-time, an occurrence of the event.

10. A system comprising:
one or more processors; and
memory storing instructions that, when executed by the one or more processors, cause the system to perform operations comprising:
presenting a runbook generation interface including functionality for defining a plurality of runbooks, wherein each runbook of the plurality of runbooks defines a corresponding set of independently executable operations;
obtaining event attributes associated with an event of a particular event type, the event having occurred prior to presentation of the runbook generation interface;
based on the event attributes, presenting, in the runbook generation interface, a first candidate operation as a recommended operation for including in a particular runbook;
receiving user input selecting the first candidate operation for including in the particular runbook; and
generating the particular runbook comprising the first candidate operation.

11. The method of claim 7, wherein presenting the first candidate operation as a recommended operation based on the event attributes comprises:
identifying a second event with a second set of event attributes that meets a similarity criteria with said event attributes associated with said event; and
determining that the first candidate operation is included in a second runbook that has been successfully used to address the second event.

12. The method of claim 7, wherein obtaining the event attributes comprises:

detecting a system topology associated with the event; and obtaining the event attributes based on characteristics of components in the system topology.

13. The method of claim 7, wherein presenting, in the runbook generation interface, the first candidate operation as a recommended operation for including in the particular runbook includes presenting a first set of operation results associated with the first candidate operation.

* * * * *

UNITED STATES PATENT AND TRADEMARK OFFICE
CERTIFICATE OF CORRECTION

| | | |
|---|---|---|
| PATENT NO. | : 11,960,929 B2 | Page 1 of 1 |
| APPLICATION NO. | : 17/850051 | |
| DATED | : April 16, 2024 | |
| INVENTOR(S) | : Patti et al. | |

It is certified that error appears in the above-identified patent and that said Letters Patent is hereby corrected as shown below:

On the Title Page

On page 2, Column 2, item (56) under Other Publications, Lines 66-67, delete "Newtork Moniroting" and insert -- Network Monitoring --, therefor.

In the Specification

In Column 1, Line 6, delete "63/262,832" and insert -- 63/261,832 --, therefor.

In Column 22, Line 17, delete "FIG. B" and insert -- FIG. 4B --, therefor.

Signed and Sealed this
Thirteenth Day of August, 2024

Katherine Kelly Vidal
*Director of the United States Patent and Trademark Office*